US008424097B2

(12) United States Patent
Uchikawa et al.

(10) Patent No.: US 8,424,097 B2
(45) Date of Patent: Apr. 16, 2013

(54) INFORMATION PROCESSING METHOD AND APPARATUS THEREOF

(75) Inventors: Hiroshi Uchikawa, Yokohama (JP); Takashi Isoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1509 days.

(21) Appl. No.: 11/539,189

(22) Filed: Oct. 6, 2006

(65) Prior Publication Data

US 2007/0083935 A1  Apr. 12, 2007

(30) Foreign Application Priority Data

Oct. 11, 2005  (JP) ................................ 2005-296961

(51) Int. Cl.
*G06F 7/04* (2006.01)
(52) U.S. Cl.
USPC ............................... 726/26; 726/30; 713/189
(58) Field of Classification Search .................... 726/26; 713/189–194
See application file for complete search history.

(56) References Cited

U.S. PATENT DOCUMENTS

| 6,028,679 | A | * | 2/2000 | Murphy ........................ 358/407 |
| 2002/0138442 | A1 | * | 9/2002 | Hori et al. ........................ 705/59 |
| 2004/0049687 | A1 | * | 3/2004 | Orsini et al. ................... 713/189 |
| 2005/0177742 | A1 | * | 8/2005 | Benson et al. ................. 713/189 |

FOREIGN PATENT DOCUMENTS

| JP | 2001-184264 | | 7/2001 |
| JP | 2002-288375 | A | 10/2002 |
| JP | 2004-166241 | | 6/2004 |
| JP | 2004-171101 | A | 6/2004 |
| JP | 2005-096381 | A | 4/2005 |
| JP | 2005-117487 | A | 4/2005 |

OTHER PUBLICATIONS

Dec. 4, 2009 Japanese Office Action which is enclosed without English Translation, that issued in Japanese Patent Application No. 2005-296961.
Aug. 7, 2009 Japanese Office Action that issued in Japanese Patent Application No. 2005-296961, which is enclosed without English Translation.
Adobe Policy Server, (http://www.adobe.co.jp/products/server/policy/main.html)—Japanese  (http://www.adobe.com/products/server/policy/)—U.S. site, printed on Oct. 4, 2006.
Information Rights Management (IRM), (http://office.microsoft.com/ja-jp/assistance/HA010397891041.aspx)—Japanese (http://office.microsoft.com/en-us/assistance/HP062208591033.aspx)—U.S. site, printed on Oct. 4, 2006.

* cited by examiner

*Primary Examiner* — Amare F Tabor
(74) *Attorney, Agent, or Firm* — Cowan, Liebowitz & Latman, P.C.

(57) ABSTRACT

In an access rights managing system, an application that can set access rights is limited, and if an information apparatus that the user uses does not install any specific application, the system cannot set desired access rights in a digital document. To solve this problem, data is received externally, and first identification information associated with access rights control is extracted from a predetermined position of the received data. Second identification information corresponding to the first identification information is obtained, and is appended to the received data. The received data is then stored in a memory.

13 Claims, 30 Drawing Sheets

F I G. 14
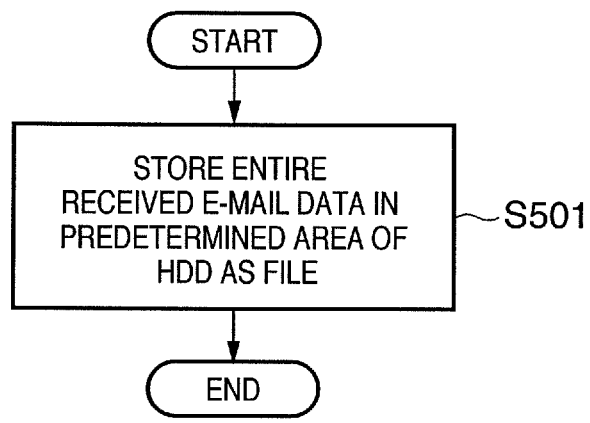

FIG. 20

| DOCUMENT ID | POLICY ID |
|---|---|
| f7b8ac1c-895a-4905-86c7-40273fe0a531 | P1 |
| f7b8ac1c-895a-4905-86c7-40273fe0a532 | P2 |
| ......... | ......... |
| f7b8ac1c-895a-4905-86c7-40273fe0a537 | P2 |

F I G. 22

| RULE ID | RULE NAME | RECEPTION MEANS | COMPARISON PROPERTY | COMPARISON VALUE | EXPRESSION | DESTINATION | POLICY ID | POLICY NAME | USER NAME | PASSWORD |
|---|---|---|---|---|---|---|---|---|---|---|
| 1 | HEAD OFFICE FAX | FAX | SENDER PHONE NUMBER | 123456789 | EQUAL TO | ftp://server/hons | P1 | EXECUTIVE | manager | ***** |
| 2 | HEAD OFFICE MAIL | MAIL | SENDER ADDRESS | honsya@aaa.com | EQUAL TO | ftp://server/hons | P2 | EXECUTIVE | manager | ***** |
| 3 | CUSTOMER 1 | MAIL | SENDER ADDRESS | user@yyy.com | EQUAL TO | eigyo@aaa.com | P3 | CUSTOMER 1 ASSIGNED | sales | ***** |
| 4 | CUSTOMER 2 | MAIL | SENDER ADDRESS | user@zzz.com | EQUAL TO | eigyo@aaa.com | P4 | CUSTOMER 2 ASSIGNED | sales | ***** |
| 5 | BRANCH OFFICE 1 | I-FAX | SENDER ADDRESS | @aaa.com | END WITH | ftp://server/shit | P5 | BRANCH OFFICE ASSIGNED | internal | ***** |
| 6 | BRANCH OFFICE 2 | I-FAX | SENDER ADDRESS | @aa.com | END WITH | ftp://server/shit | P6 | BRANCH OFFICE ASSIGNED | internal | ***** |
| 7 | PRIVATE BOX F | FAX | SUB-ADDRESS | 10 | EQUAL TO | localBox00 | P7 | USER A | user_A | ***** |
| 8 | PRIVATE BOX M | MAIL | SENDER ADDRESS | my@aaa.com | EQUAL TO | localBox00 | P7 | USER A | user_A | ***** |

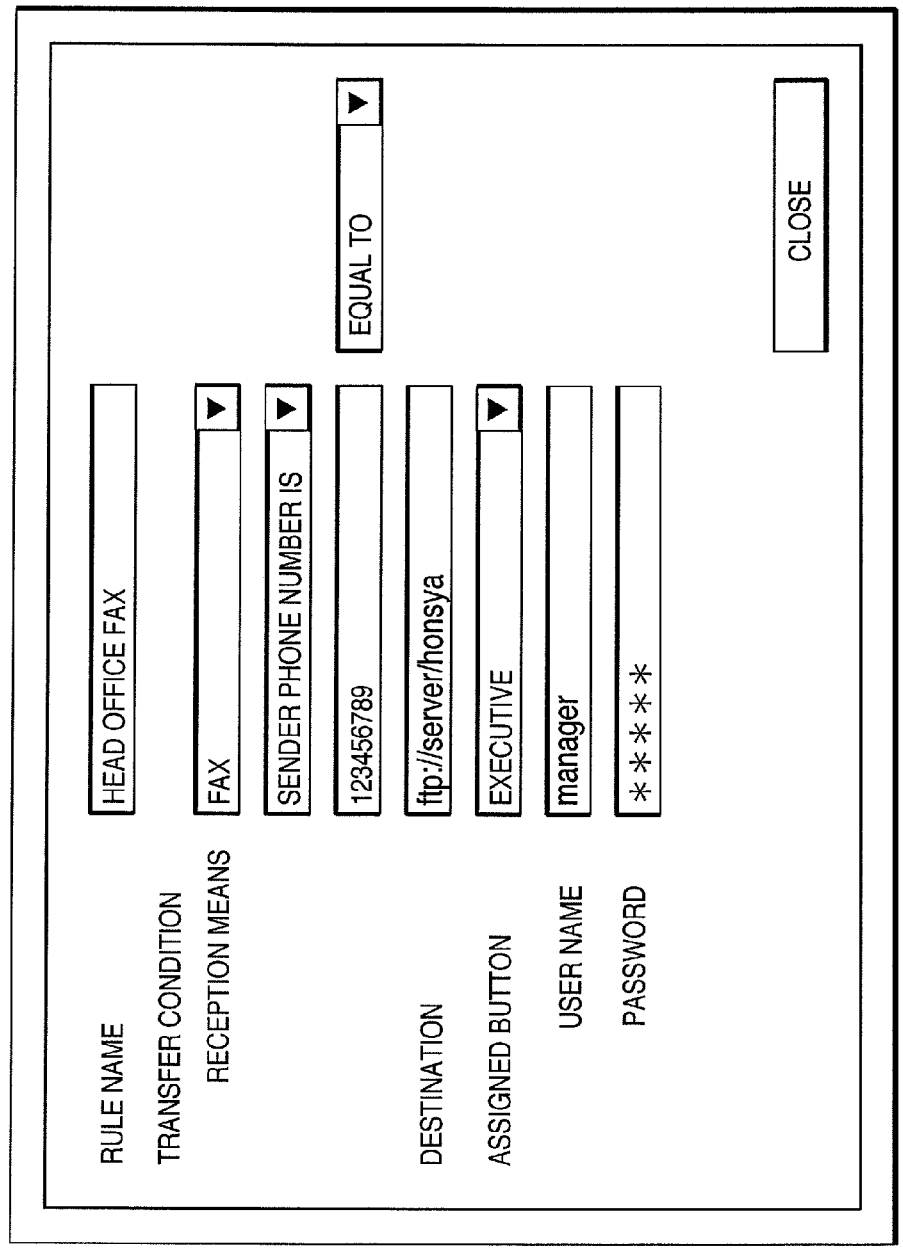

F I G. 24B
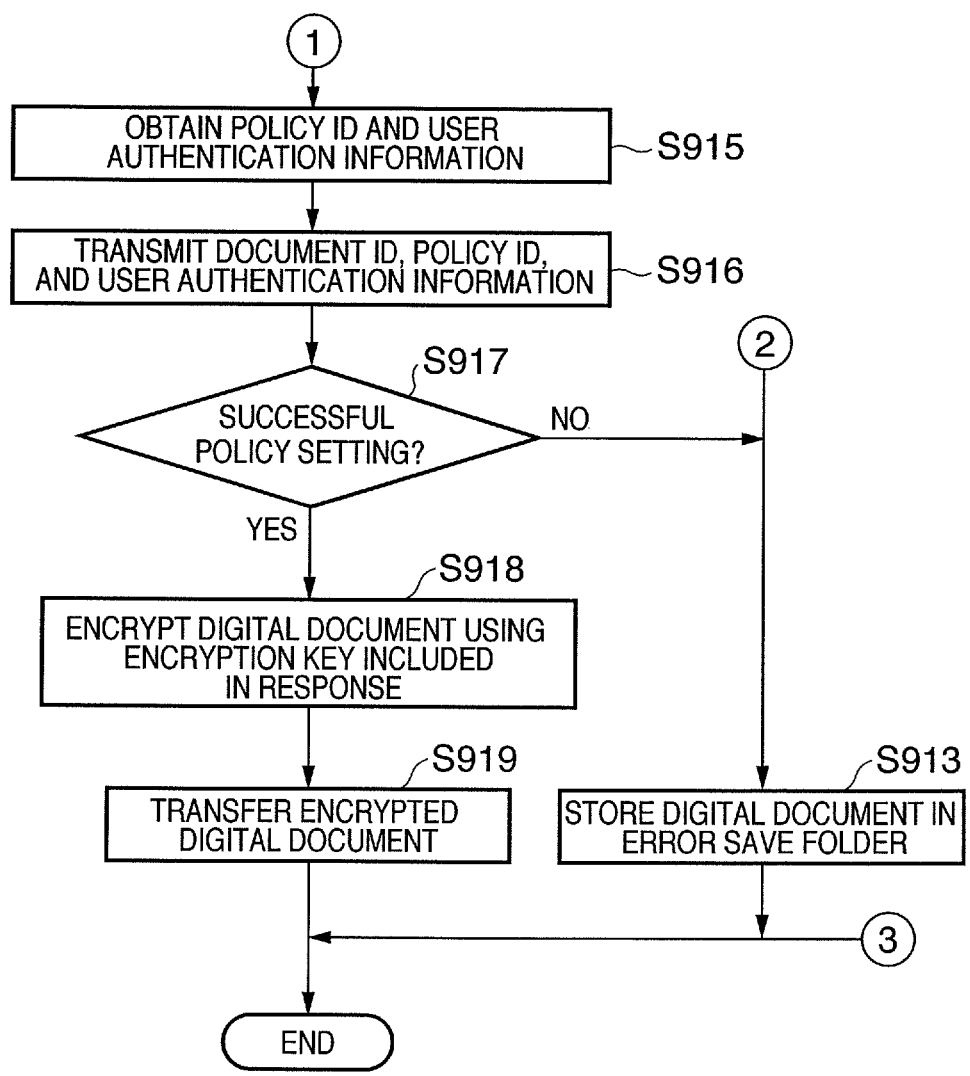

F I G. 25

| RULE ID | RULE NAME | RECEPTION MEANS | COMPARISON PROPERTY | COMPARISON VALUE | EXPRESSION | DESTINATION | POLICY ID | POLICY NAME | USER NAME | PASSWORD | OVERWRITE |
|---|---|---|---|---|---|---|---|---|---|---|---|
| 1 | HEAD OFFICE FAX | FAX | SENDER PHONE NUMBER | 123456789 | EQUAL TO | ftp://server/hons | P1 | EXECUTIVE | manager | ***** | ON |
| 2 | HEAD OFFICE MAIL | MAIL | SENDER ADDRESS | honsya@aaa.com | EQUAL TO | ftp://server/hons | P2 | EXECUTIVE | manager | ***** | ON |
| 3 | CUSTOMER 1 | MAIL | SENDER ADDRESS | user@yyy.com | EQUAL TO | eigyo@aaa.com | P3 | CUSTOMER 1 ASSIGNED | sales | ***** | OFF |
| 4 | CUSTOMER 2 | MAIL | SENDER ADDRESS | user@zzz.com | EQUAL TO | eigyo@aaa.com | P4 | CUSTOMER 2 ASSIGNED | sales | ***** | OFF |
| 5 | BRANCH OFFICE 1 | I-FAX | SENDER ADDRESS | @aaa.com | END WITH | ftp://server/shit | P5 | BRANCH OFFICE ASSIGNED | internal | ***** | ON |
| 6 | BRANCH OFFICE 2 | I-FAX | SENDER ADDRESS | @aa.com | END WITH | ftp://server/shit | P6 | BRANCH OFFICE ASSIGNED | internal | ***** | ON |
| 7 | PRIVATE BOX F | FAX | SUB-ADDRESS | 10 | EQUAL TO | localBox00 | P7 | USER A | user_A | ***** | ON |
| 8 | PRIVATE BOX M | MAIL | SENDER ADDRESS | my@aaa.com | EQUAL TO | localBox00 | P7 | USER A | user_A | ***** | ON |

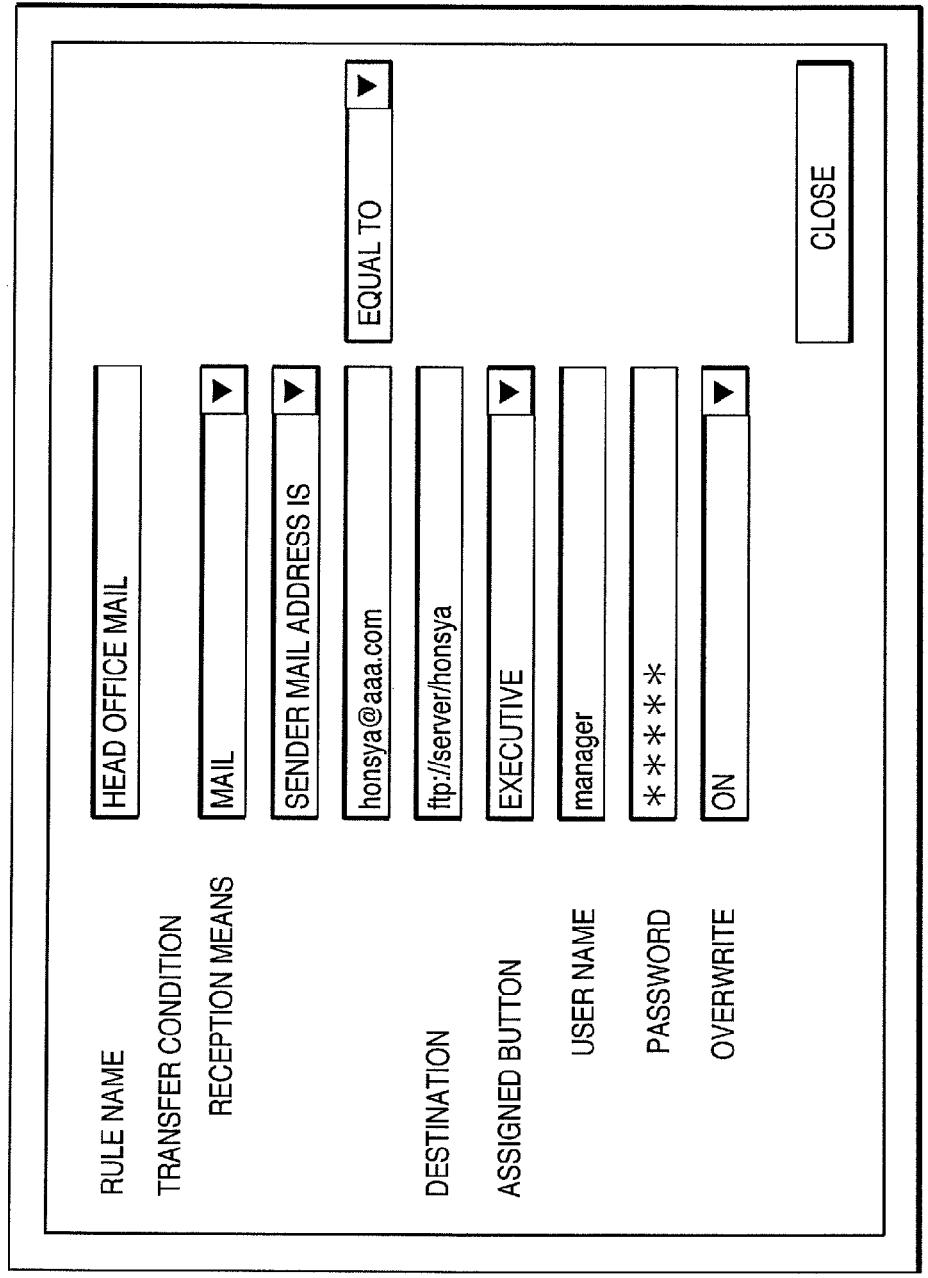

FIG. 28

RECEPTION LOG

| RECEIPT NUMBER | DATE & TIME | SOURCE | TYPE | RESULT | POLICY ASSIGNMENT |
|---|---|---|---|---|---|
| 5001 | May 17 00:52:48 | 12345678 | FAX | OK | RULE PREFERENCE |
| 5002 | May 17 01:52:48 | 12345678 | FAX | OK | RULE PREFERENCE |
| 5003 | May 17 02:52:48 | honsya@aaa.com | MAIL | OK | RULE PREFERENCE |
| 5004 | May 18 00:52:48 | shiten1@aaa.com | I-FAX | OK | RULE PREFERENCE |
| 5005 | May 18 01:52:48 | user@yyy.com | MAIL | OK | ORIGINAL PREFERENCE |
| 5006 | May 18 02:52:48 | shiten2@aaa.com | I-FAX | OK | NG |
| 5007 | May 19 00:52:48 | user@zzz.com | MAIL | OK | ORIGINAL PREFERENCE |
| 5008 | May 19 06:52:48 | 987654321 | FAX | OK | |

1303, 1302

CLOSE

INFORMATION PROCESSING METHOD AND APPARATUS THEREOF

BACKGROUND OF THE INVENTION

1. Field of the Invention

The present invention relates to information processing for controlling access rights of digital data.

2. Description of the Related Art

In recent years, an access rights managing system which permits only specific users to access (browse, edit, print, and the like) digital documents, or which has a function of setting a valid period for each digital document and inhibiting access to the digital document after the valid period has expired in order to prevent information leakage has been developed. Such access rights managing system controls access rights based on a policy to be applied to a given document upon creation of a digital document.

As the access rights managing server which has already been released, for example, Adobe® Policy Server (http://www.adobe.co.jp/products/server/policy/main.html) is known. The Policy Server can attain access control of PDF (Portable Document Format) files. However, an application which can set access rights by the Policy Server is Acrobat® alone available from that company.

Information Rights Management (IRM) (http://office.microsoft.com/ja-jp/assistance/HA010397891041.aspx) announced by Microsoft® allows the aforementioned access rights control. However, an application which can set access rights is only an office application available from that company.

That is, in the conventional access rights managing system, an application which can set access rights is limited, and if an information apparatus that the user uses does not install a specific application, desired access rights cannot be set for a digital document.

As an evaluation method of access rights control associated with data, a conditional access permission method is known (Japanese Patent Application Laid-Open No. 2001-184264). Also, a distribution method of a policy that describes control to be executed is known (Japanese Patent Application Laid-Open No. 2004-166241).

On the other hand, a multi-functional peripheral equipment (to be abbreviated as MFP hereinafter) connected to a public switched telephone network (to be abbreviated as PSTN hereinafter) or a network has a function of receiving digital documents from external information apparatuses via various routes. The MFP has a function of storing the received digital documents of various data formats in an area called a box of its own storage device, or transferring them to other information apparatuses. That is, the digital documents received by the MFP are distributed through network environments. Therefore, when the access rights managing system is introduced in an environment of an office or the like, the MFP which stores the received digital documents in the box or outputs them onto the network environments may become a security hole.

SUMMARY OF THE INVENTION

The first aspect of the present invention discloses an information processing method comprising the steps of: receiving data externally; extracting first identification information associated with access rights control from a predetermined position of the received data; obtaining second identification information corresponding to the first identification information; and appending the second identification information to the received data and storing the received data in a memory.

According to the present invention, access rights control of externally received data can be attained. For example, access rights control of data which is received from an information apparatus having no application which can set access rights or from an information apparatus which cannot access the access rights managing server can be attained.

The second aspect of the present invention discloses an information processing method comprising the steps of: receiving data externally; retrieving a rule, which matches predetermined information in the received data and is set in a table; obtaining, from an access rights managing server, an encryption key corresponding to first identification information which is set in the matching rule and is associated with access rights control, and second identification information extracted from the received data; encrypting the received data using the encryption key; and transmitting the encrypted data or saving the encrypted data in a memory in accordance with a setting of the matching rule.

According to the present invention, access rights control of received data can be made according to source information or a reception method.

Further features of the present invention will become apparent from the following description of exemplary embodiments with reference to the attached drawings.

BRIEF DESCRIPTION OF THE DRAWINGS

FIG. 14 is a flowchart showing details of data reception processing;

FIG. 20 shows an example of a digital document list managed by the access rights managing server;

FIG. 22 shows an example of data held by a reception rule shown in FIG. 18;

FIG. 23 shows an example of a rule registration window displayed upon registering a reception rule;

FIG. 25 shows an example of data held by a reception rule according to the fifth embodiment;

FIG. 26 shows an example of a rule registration window displayed upon registering a reception rule;

FIG. 28 shows an example of a reception log window including a policy setting log of a received digital document.

DESCRIPTION OF THE EMBODIMENTS

Information processing according to preferred embodiments of the present invention will be described in detail hereinafter with reference to the accompanying drawings. Note that digital documents which record text and images which can be read and interpreted by the user will be explained as objects which are to undergo access rights control and management. However, data files which record data such as database data which can be read and interpreted by a computer can also be objects which are to undergo access rights control and management.

First Embodiment

[System Arrangement]

Figure 1:
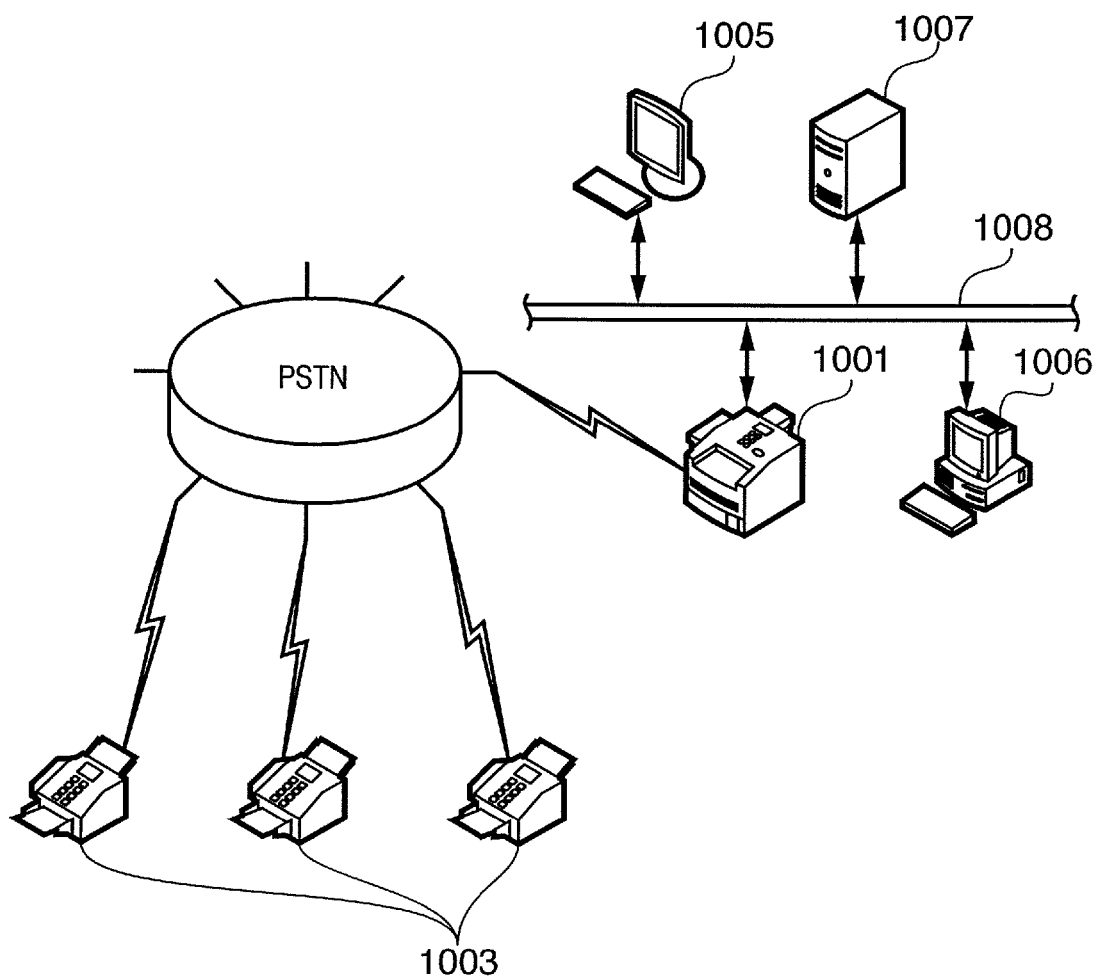
FIG. 1 is a diagram showing the arrangement of an information processing system.

FIG. 1 shows the arrangement of an information processing system.

An access rights managing server 1007 provides a function of controlling various access rights (e.g., browse, a valid period, copy, print, change, and the like) for individual files by individual users.

Figure 2A:
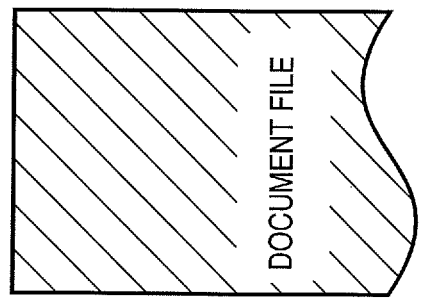
FIGS. 2A to 2C are views for explaining encryption of a document and appending of a document ID to the encrypted document.
Figure 2B:
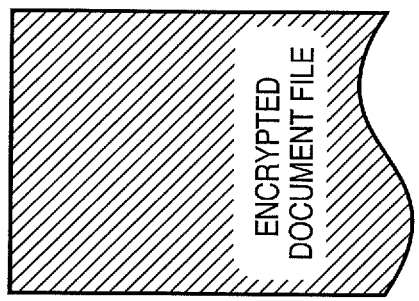
Figure 2C:
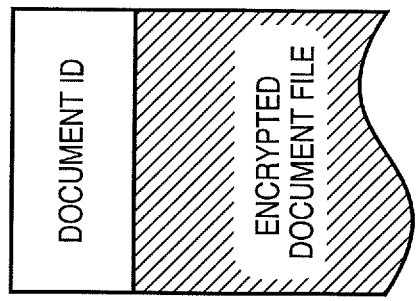

For example, the user operates a client computer (to be referred to as "client" hereinafter) 1005 to create a document, and obtains a document ID of the created document from the access rights managing server 1007 via a network 1008. Then, the user designates an access rights control ID (policy ID) of an access rights control method (policy), which is registered in advance in the access rights managing server 1007 and is set by that user, together with the document ID. The access rights managing server 1007 registers the document ID, the access rights control ID, and a decryption key in its own storage area. Then, the access rights managing server 1007 sends an encryption key to the client 1005. The client 1005 encrypts the created document (FIG. 2A) by the received encryption key, and appends, to the encrypted document (FIG. 2B), the document ID and information (host name, IP address, or the like) that specifies the access rights managing server 1007 to the encrypted document (FIG. 2C). After completion of encryption, the received encryption key may be deleted.

The user who wants to refer to a document operates a client 1006 to transmit the document ID of the document of interest and various conditions (user ID, browse, print, copy, distribution, and the like) associated with document reference to the access rights managing server 1007. The access rights managing server 1007 compares the access rights control method indicated by the access rights control ID corresponding to the received document ID with the received conditions to determine whether or not to permit the reference to the document of interest. If the reference to the document is permitted, the access rights managing server 1007 transmits the decryption key corresponding to the received document ID to the client 1006. The client 1006 deletes the document ID from a file of the document of interest, and decrypts the encrypted document using the received decryption key.

The aforementioned access rights control is achieved not only between the clients but also between an MFP 1001 and the client.

[Arrangement of Information Apparatus]

Figure 3:
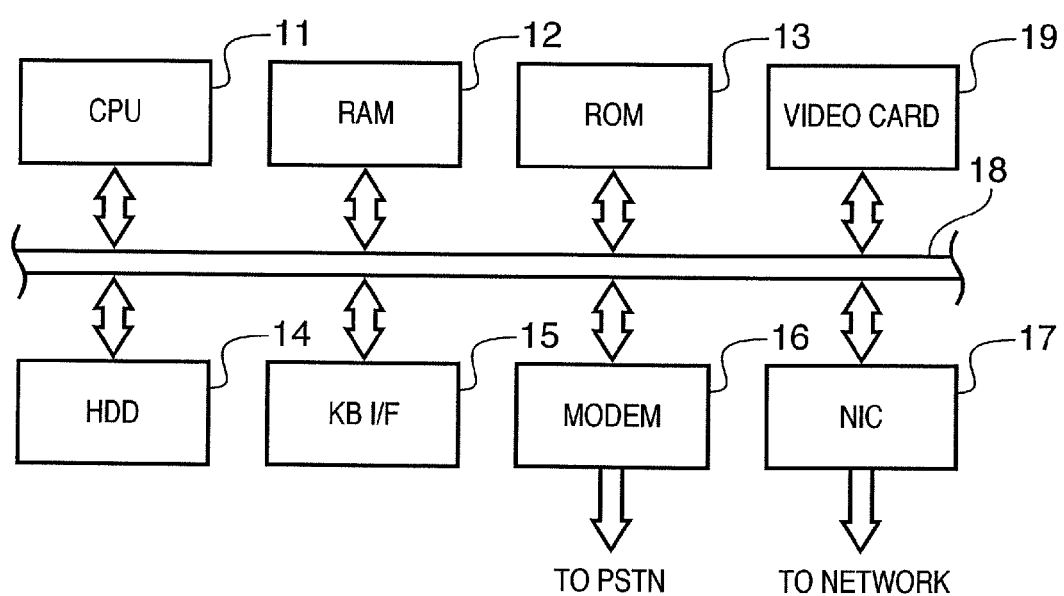
FIG. 3 is a block diagram showing the arrangement of an information apparatus such as an access rights managing server, clients, MFP, facsimile (FAX) apparatuses, and the like shown in FIG. 1.

FIG. 3 is a block diagram showing the arrangement of an information apparatus such as the access rights managing server, clients, MFP, FAX apparatuses, and the like shown in FIG. 1.

A CPU 11 executes an operating system (OS) and various programs stored in a ROM 13 and hard disk drive (HDD) 14 using a RAM 12 as a work area, and controls respective components to be described below via a system bus 18. Programs which are executed by the CPU 11 of each of the access rights managing server 1007 and the clients 1005 and 1006 include the aforementioned document creation program, an application program for managing access rights, and programs of processes to be described later.

A keyboard interface (KB I/F) 15 connects input devices such as a keyboard, mouse, and the like. A video card 19 connects a monitor such as an LCD or the like. The CPU 11 displays a user interface on the monitor. The user operates the keyboard and mouse based on the user interface and inputs commands and data to the CPU 11. In case of the MFP 1001 or a FAX apparatus 1003, a numeric keypad and various operation keys which replace the keyboard and a monitor are arranged on a control panel.

A MODEM 16 serves as an interface with the PSTN, and a network interface card (NIC) 17 serves as an interface with the network 1008 such as a local area network (LAN) or the like. Note that the FAX apparatus 1003 may not incorporate any NIC 17 in some cases.

[Access Rights Management of FAX-Received Document]

In case of the system arrangement shown in FIG. 1, as described above, the access rights control can be achieved not only between the clients but also between the MFP 1001 and client. However, the access rights control cannot apply to a document which is FAX-transmitted from a FAX apparatus 1003 that is not connected to the network 1008 and cannot communicate with the access rights management server 1007, and is FAX-received by the MFP 1001 or client.

The processing for setting the access rights of a document which is FAX-received from the FAX apparatus 1003 by the MFP 1001 via the PSTN will be described below. Note that FAX transmission is not limited to that made by the FAX apparatus 1003, but may be made by the client or MFP connected to the PSTN. Also, FAX reception is not limited to that made by the MFP 1001, but may be made by the information apparatus (e.g., the client 1005 or 1006) which can access the access rights managing server 1007 via the network 1008.

The FAX apparatus 1003 embeds the access rights control ID (for example, a predetermined character string) designated by the user in the header of a FAX document to be transmitted, and transmits the FAX document to a phone number designated by the user.

Figure 4:
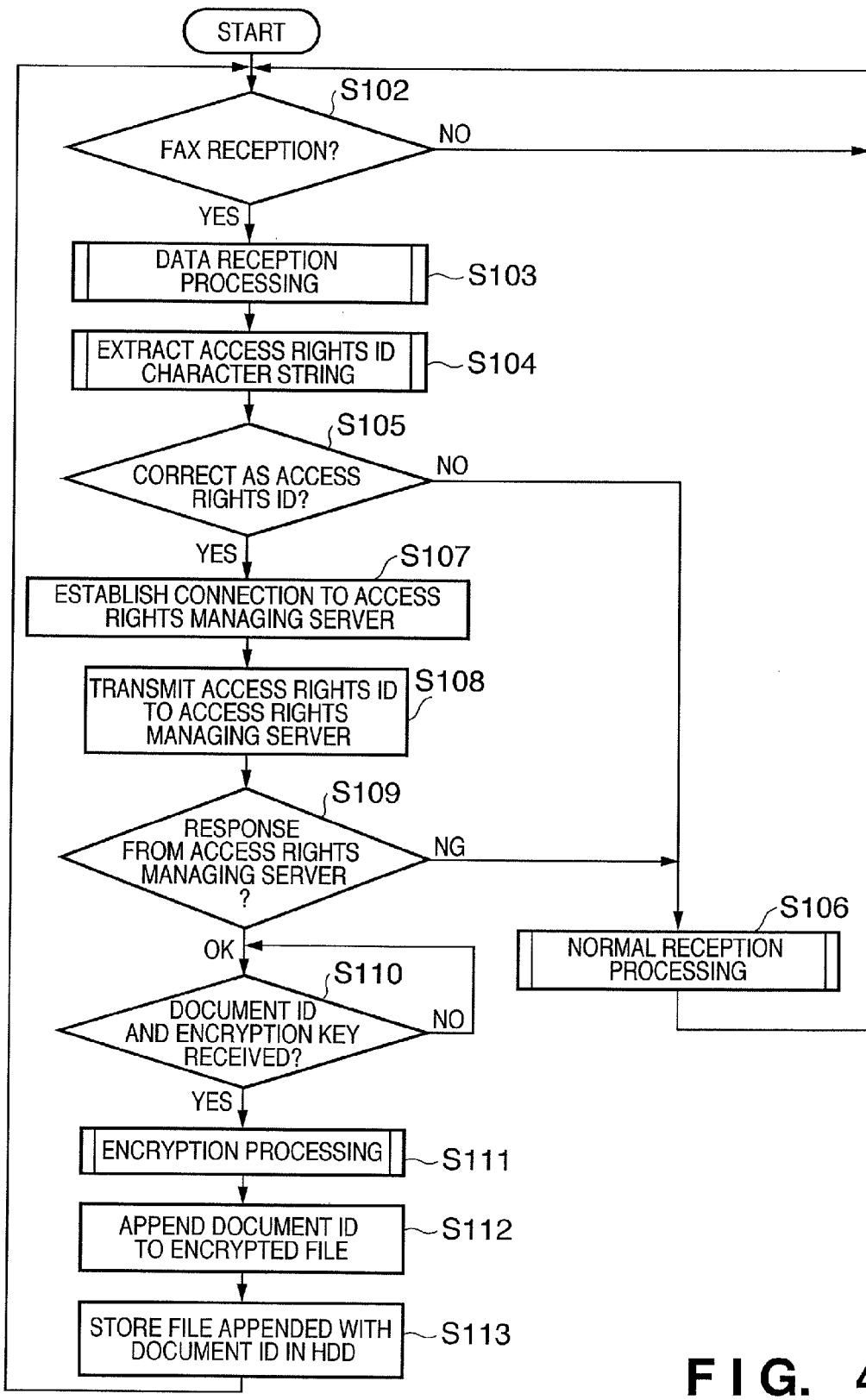
FIG. 4 is a flowchart for explaining the processing executed upon FAX reception by an MFP.

FIG. 4 is a flowchart for explaining processing upon FAX reception by the MFP 1001.

The MFP 1001 stands by until it receives a FAX signal (S102). Upon reception of a FAX signal, the MFP 1001 executes data reception processing (S103).

Figure 5:
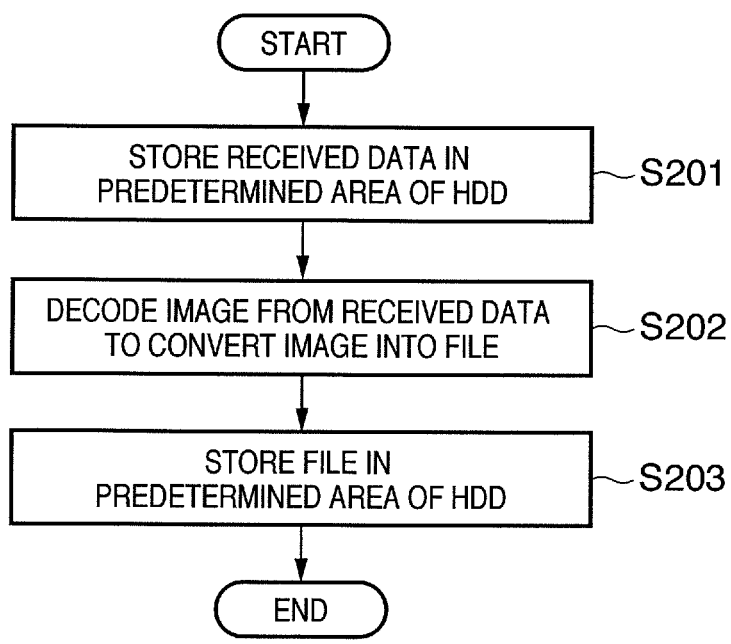
FIG. 5 is a flowchart showing details of data reception processing.

FIG. 5 is a flowchart showing details of the data reception processing. The CPU 11 stores data received by the MODEM 16 in a predetermined area of the HDD 14 (S201). The CPU 11 decodes an image part of the received data to convert that image (to be referred to as "received image" hereinafter) into a file (S202) and stores the file in the predetermined area of the HDD 14 (S203).

Referring back to FIG. 4, the CPU 11 extracts the access rights control ID designated by a sender from the received data (S104).

Figure 6:
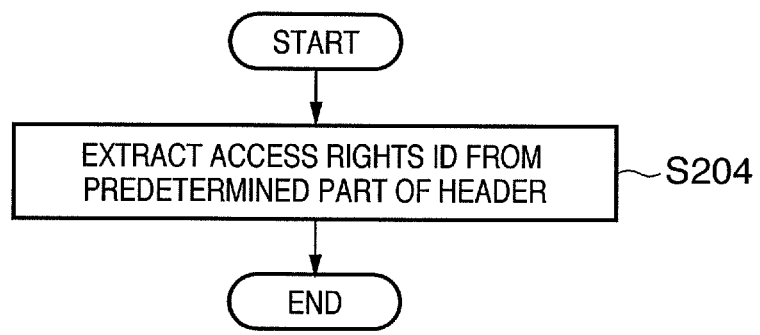
FIG. 6 is a flowchart showing the extraction processing of an access rights control ID.

FIG. 6 is a flowchart showing the extraction processing of the access rights control ID. The CPU 11 extracts the character string from a predetermined part of the header of the received data as the access rights control ID (S204). As the predetermined part of the header, for example, a sender number field or the like may be used.

Referring back to FIG. 4, the CPU 11 checks if the extracted character string is correct as the access rights control ID (S105). If the character string is incorrect, the CPU 11 executes normal reception processing (S106), and the process returns to step S102.

If the extracted character string is correct as the access rights control ID, the CPU 11 establishes connection to the access rights managing server 1007 (S107). The CPU 11 transmits the access rights control ID (S108), and waits for a response from the access rights managing server 1007 (S109). If the response from the access rights managing server 1007 indicates "unregistered access rights control ID (NG)", the CPU 11 executes normal reception processing (S106), and the process returns to step S102.

If the response from the access rights managing server 1007 indicates "already registered access rights control ID (OK)", the CPU 11 waits for reception of a document ID and encryption key from the access rights managing server 1007 (S110). Upon reception of the document ID and encryption key, the CPU 11 executes encryption processing (S111).

Figure 7:
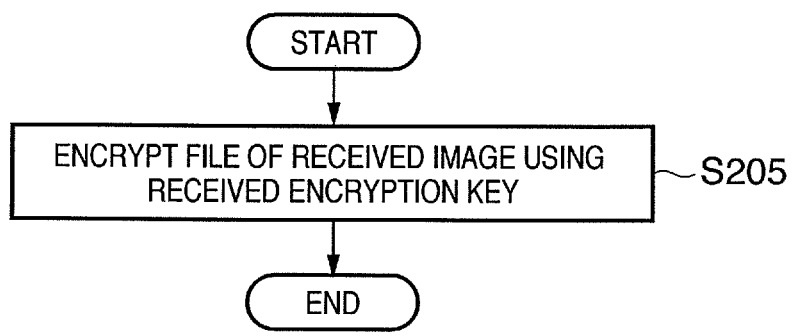
FIG. 7 is a flowchart showing encryption processing.

FIG. 7 is a flowchart showing the encryption processing. The CPU 11 encrypts a file of the received image stored in the HDD 14 using the received encryption key (S205). Note that the CPU 11 deletes the file before encryption and the encryption key after completion of the encryption processing from the HDD 14 by, e.g., overwriting them by an encrypted file or random number a predetermined number of times.

Referring back to FIG. 4, the CPU 11 appends the document ID to the file encrypted in step S111 (S112), and stores the encrypted file appended with the document ID in a predetermined area of the HDD 14 (S113). The process then returns to step S102.

[Modification]

The example in which the access rights control ID is embedded in the header specified by the FAX protocol has been explained. However, a field that a FAX vendor can freely use, i.e., a non-standard protocol signal such as NSX for G3 FAX or NSC for G4 FAX may be used. In this case, the access rights control ID is written in NSX for G3 FAX or NSC for G4 FAX.

Figure 8:
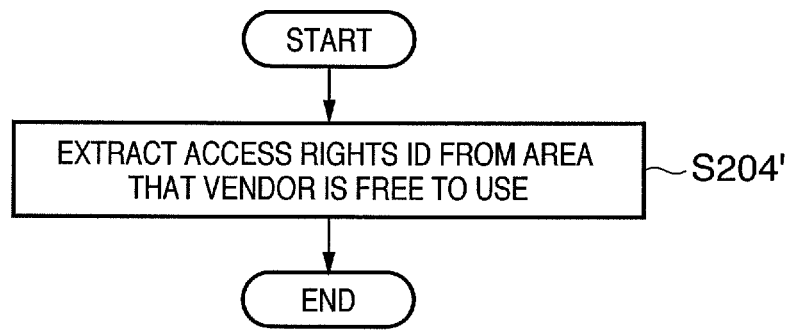
FIG. 8 is a flowchart showing the extraction processing of an access rights control ID.

In this case, in the reception operation, details (FIG. 6) of step S104 shown in FIG. 4 are different. FIG. 8 is a flowchart showing the extraction processing of the access rights control ID. That is, the CPU 11 extracts a character string from a field of the received data that the vendor can freely use as the access rights control ID (S204').

In this way, when the information apparatus located near the user does not install any specific application which can set access rights or cannot access the access rights managing server 1007, access rights can be set in a document to be FAX-transmitted. Note that the information apparatus corresponds to the FAX apparatus 1003, a client or MFP (not shown) which is not connected to the network 1008, or the like in case of the system arrangement shown in FIG. 1.

Second Embodiment

Information processing according to the second embodiment of the present invention will be described below. Note that the same reference numerals in the second embodiment denote the same parts as in the first embodiment, and a detailed description thereof will be omitted.

[Access Rights Management for E-mail Attached Document]

When the network 1008 shown in FIG. 1 is connected to a wide-area network (WAN) such as the Internet or the like, the clients 1005 and 1006 and the MFP 1001 can receive documents attached to e-mail messages which go through the WAN. However, when an information apparatus, which transmits the e-mail message, cannot access the access rights managing server 1007, the access rights control cannot be achieved.

The clients 1005 and 1006 and the MFP 1001 can receive documents attached to e-mail messages which are transmitted by an information apparatus connected to the network 1008. However, when the information apparatus, which transmits the e-mail massage, does not have a function to control the access rights in association with the access rights managing server 1007, the access rights control cannot be achieved.

The second embodiment will explain processing for setting the access rights of a document attached to an e-mail message received by the MFP 1001 via the WAN or the like. Note that e-mail reception is not limited to that by the MFP 1001 but may be made by the information apparatus (e.g., the client 1005 or 1006) which can access the access rights managing server 1007. Note that the processing upon e-mail reception described in the second embodiment can apply to Internet FAX reception when the MFP 1001 has an Internet FAX function.

Figure 9:
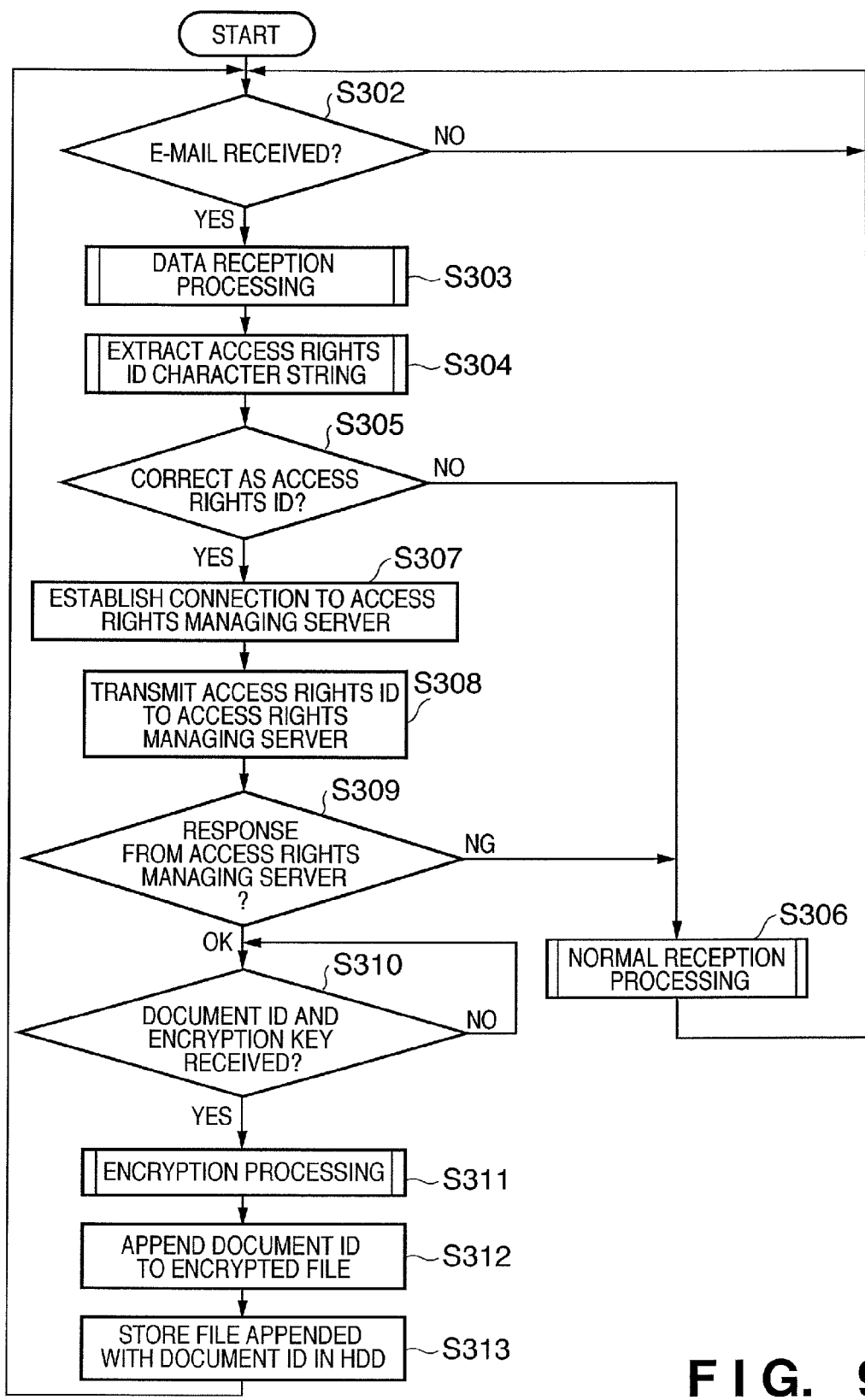
FIG. 9 is a flowchart for explaining the processing executed upon reception of e-mail by an MFP according to the second embodiment.

FIG. 9 is a flowchart for explaining the processing upon e-mail reception by the MFP 1001.

The MFP 1001 waits until it receives an e-mail message (S302). Upon reception of the e-mail message, the MFP 1001 executes data reception processing (S303).

Figure 10:
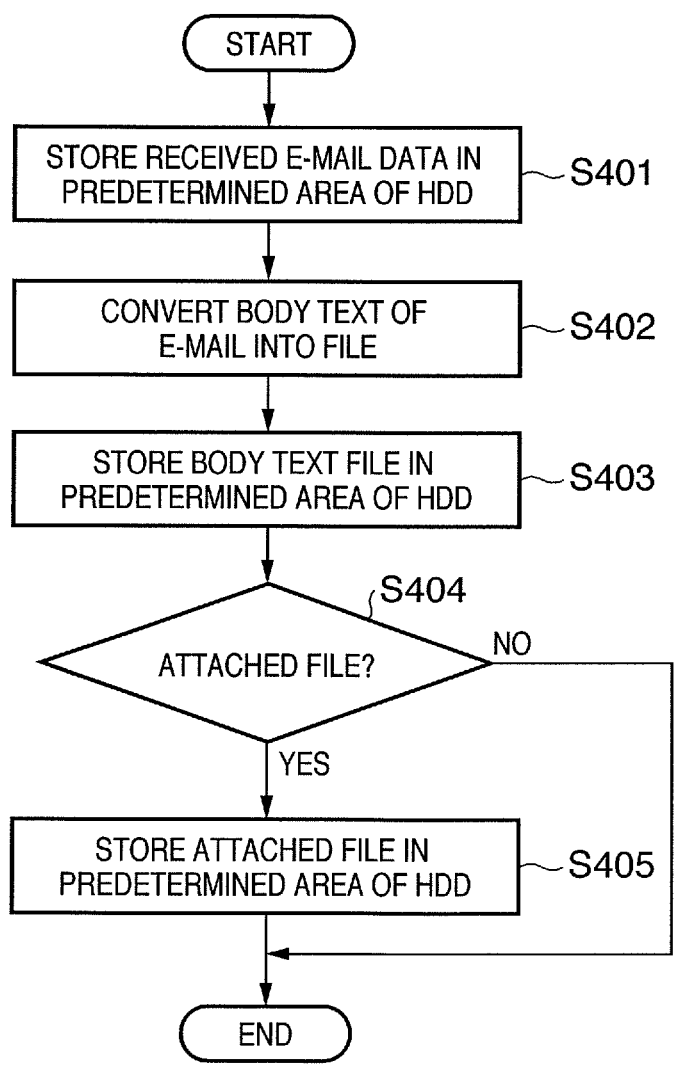
FIG. 10 is a flowchart showing details of data reception processing.

FIG. 10 is a flowchart showing details of the data reception processing. The CPU 11 stores the received e-mail message data in a predetermined area of the HDD 14 (S401). The CPU 11 converts body text of the e-mail message into a file (S402), and stores the body text file in a predetermined area of the HDD 14 (S403). The CPU 11 checks if the e-mail message includes an attached file (S404). If the e-mail message includes an attached file, the CPU 11 stores the attached file in a predetermined area of the HDD 14 (S405).

Referring back to FIG. 9, the CPU 11 extracts an access rights control ID designated by a sender from the received data (S304).

Figure 11:
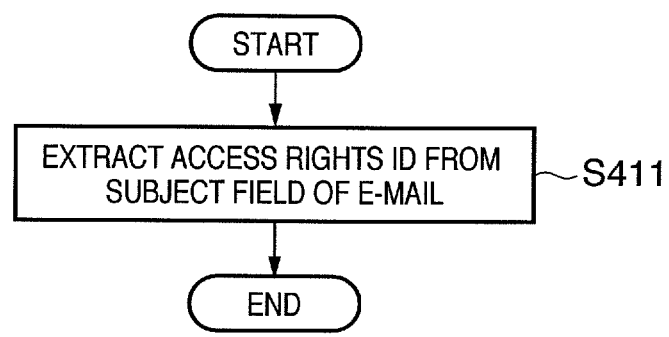
FIG. 11 is a flowchart showing the extraction processing of an access rights control ID.

FIG. 11 is a flowchart showing the extraction processing of the access rights control ID. The CPU 11 extracts a character string in a Subject field in the header of the received data as the access rights control ID (S411).

Referring back to FIG. 9, the CPU 11 checks if the extracted character string is correct as the access rights control ID (S305). If the character string is incorrect, the CPU 11 executes normal reception processing (S306), and the process returns to step S302.

If the extracted character string is correct as the access rights control ID, the CPU 11 establishes connection to the access rights managing server 1007 (S307). The CPU 11 transmits the access rights control ID (S308), and waits for a response from the access rights managing server 1007 (S309). If the response from the access rights managing server 1007 indicates "unregistered access rights control ID (NG)", the CPU 11 executes normal reception processing (S306), and the process returns to step S302.

If the response from the access rights managing server 1007 indicates "already registered access rights control ID (OK)", the CPU 11 waits for reception of a document ID and encryption key from the access rights managing server 1007 (S310). Upon reception of the document ID and encryption key, the CPU 11 executes encryption processing (S311).

Figure 12:
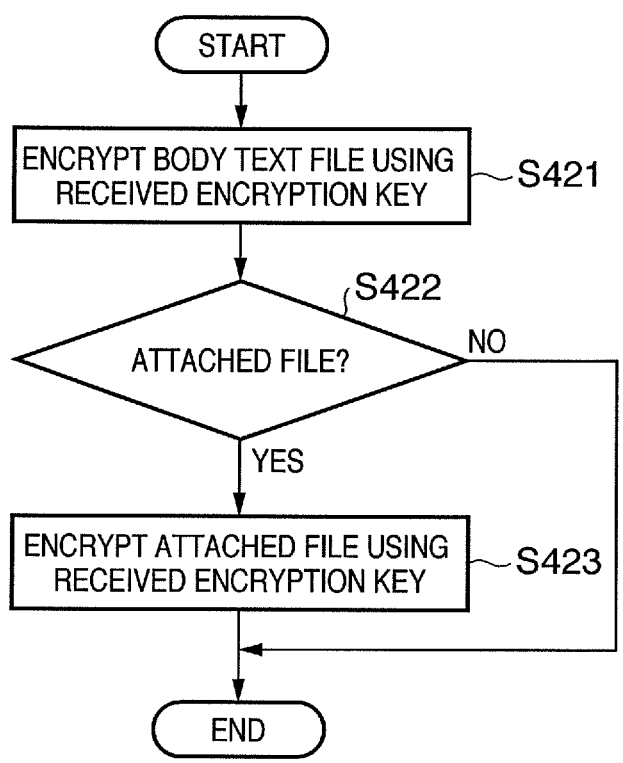
FIG. 12 is a flowchart showing encryption processing.

FIG. 12 is a flowchart showing the encryption processing. The CPU 11 encrypts the body text file stored in the HDD 14 using the received encryption key (S421). The CPU 11 checks if an attached file is stored (S422). If the attached file is stored, the CPU 11 encrypts the attached file stored in the HDD 14 using the received encryption key (S423). Note that the CPU 11 deletes the file before encryption and the encryption key after completion of the encryption processing from the HDD 14 by, e.g., overwriting them by an encrypted file or random number a predetermined number of times.

Referring back to FIG. 9, the CPU 11 appends the document ID to the file encrypted in step S311 (S312), and stores the encrypted file appended with the document ID in a predetermined area of the HDD 14 (S313). The process then returns to step S302. Note that the CPU 11 checks if the attached file is stored in the encryption processing in step S311. Alternatively, the CPU 11 may check the presence/absence of an attached file during, e.g., the data reception processing in step S303. In this case, the CPU 11 executes the extraction processing of the access rights control ID character string in step S304 for the e-mail message which is determined in step S303 that an attached file is included. On the other hand, the CPU 11 can execute normal reception processing (S306) for the e-mail message which is determined that no attached file is included.

[Modification]

The above embodiment has exemplified a case wherein the access rights control ID is designated in the Subject field of an e-mail message. Alternatively, other header elements of an e-mail message may be used. Also, a method of describing the access rights control ID in body text of an e-mail message may be used.

Figure 13:
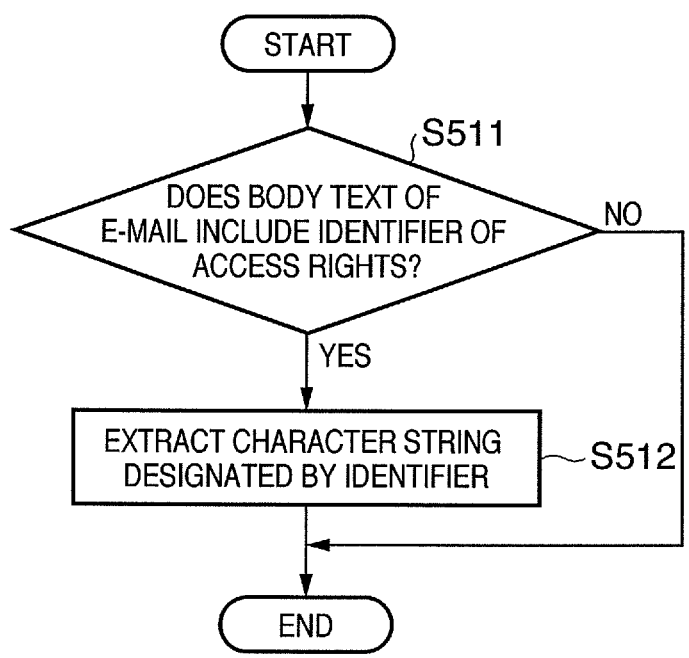
FIG. 13 is a flowchart showing the extraction processing of an access rights control ID.

In this case, in the reception operation, details (FIG. 11) of step S304 shown in FIG. 9 are different. FIG. 13 is a flowchart showing the extraction processing of the access rights control ID. The CPU 11 retrieves the body text of the e-mail message for an identifier of a predetermined access rights control ID (S511). Upon detection of the identifier, the CPU 11 extracts a character string designated by that identifier as the access rights control ID (S512). Note that the character string to be extracted is a character string from a position immediately after the identifier to that immediately before a line feed code or a predetermined code, or a character string with a predetermined length after the identifier.

The above embodiment has exemplified a case wherein the access rights control corresponding to the extracted access rights control ID applies to the body text and attached file of the e-mail message. However, when the MFP 1001 has a mail transfer function, print function, browse function, and the like, the entire received e-mail message data desirably undergoes the access rights control. For example, the entire e-mail message data includes the header as the information except for the body text and attached file.

Figure 15:
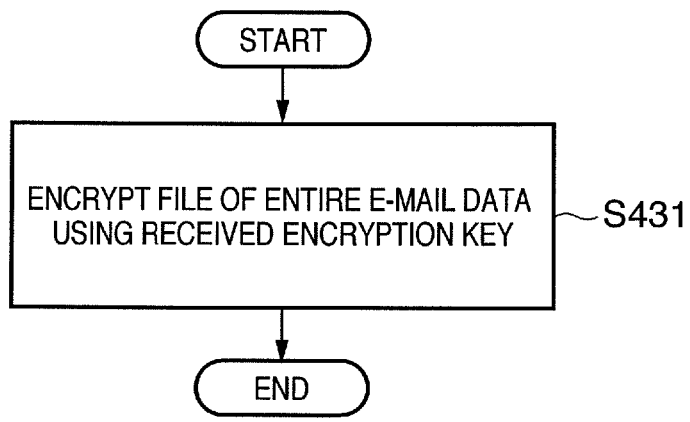
FIG. 15 is a flowchart showing details of encryption processing.

In this case, in the reception operation, details (FIG. 10) of step S303 shown in FIG. 9 and those (FIG. 12) of the encryption processing (S311) are different. FIG. 14 is a flowchart showing details of the data reception processing. The CPU 11 stores the entire received e-mail message data in a predetermined area of the HDD 14 as a file (S501). FIG. 15 is a flowchart showing details of the encryption processing. The CPU 11 encrypts the file of the entire e-mail message data using the received encryption key (S431).

In this way, when the information apparatus located near the user does not install any specific application which can set access rights or cannot access the access rights managing server 1007, access rights can be set in the body text and attached file of an e-mail message. Note that the information apparatus corresponds to a client or MFP (not shown) which is not connected to the network 1008, or the like in case of the system arrangement shown in FIG. 1.

Third Embodiment

Information processing according to the third embodiment of the present invention will be described below. Note that the same reference numerals in the third embodiment denote the same parts as in the first and second embodiments, and a detailed description thereof will be omitted.

The above embodiments have explained the method of setting the access rights control ID in the FAX header in FAX communications including Internet FAX or the method of setting the access rights control ID in the Subject field or body text of an e-mail message. However, the transmitting side may append an access rights control ID to a document to be FAX-transmitted or a file to be attached to an e-mail message using the application. In this case, the receiving side can extract the access rights control ID from the FAX-received document or the file attached to the received e-mail message to control the access rights.

Fourth Embodiment

Information processing according to the fourth embodiment of the present invention will be described below. Note that the same reference numerals in the fourth embodiment denote the same parts as in the first to third embodiments, and a detailed description thereof will be omitted.

[System Arrangement]

Figure 16:
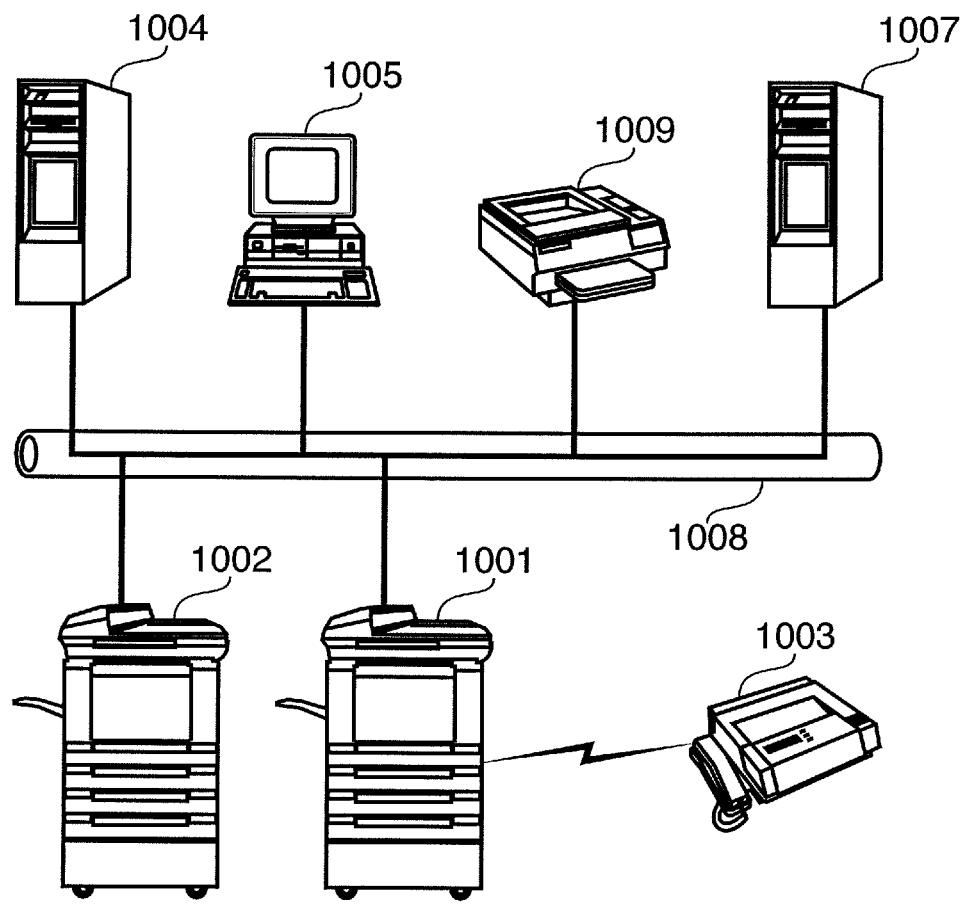
FIG. 16 is a diagram showing the arrangement of a system according to the fourth embodiment.

FIG. 16 shows the arrangement of a system according to the fourth embodiment.

MFPs 1001 and 1002, an application server 1004, a client 1005, an access rights managing server 1007, a printer 1009, and the like are connected to a network 1008 such as a LAN or the like.

The MFP 1001 can make a FAX communication with a FAX apparatus 1003 via the PSTN.

On the application server 1004, a database (DB) server which stores images scanned by the MFPs 1001 and 1002 from originals and a mail server which exchanges e-mail messages via the WAN operate. The client 1005 establishes connection to the application server 1004, downloads data such as images and the like stored in the server, and displays the downloaded data on its monitor. The client 1005 generates data (PDL data) in a page description language format including an image or the like, and can print it using the printer 1009 or MFP 1001 or 1002.

[Arrangement of MFP]

Figure 17:
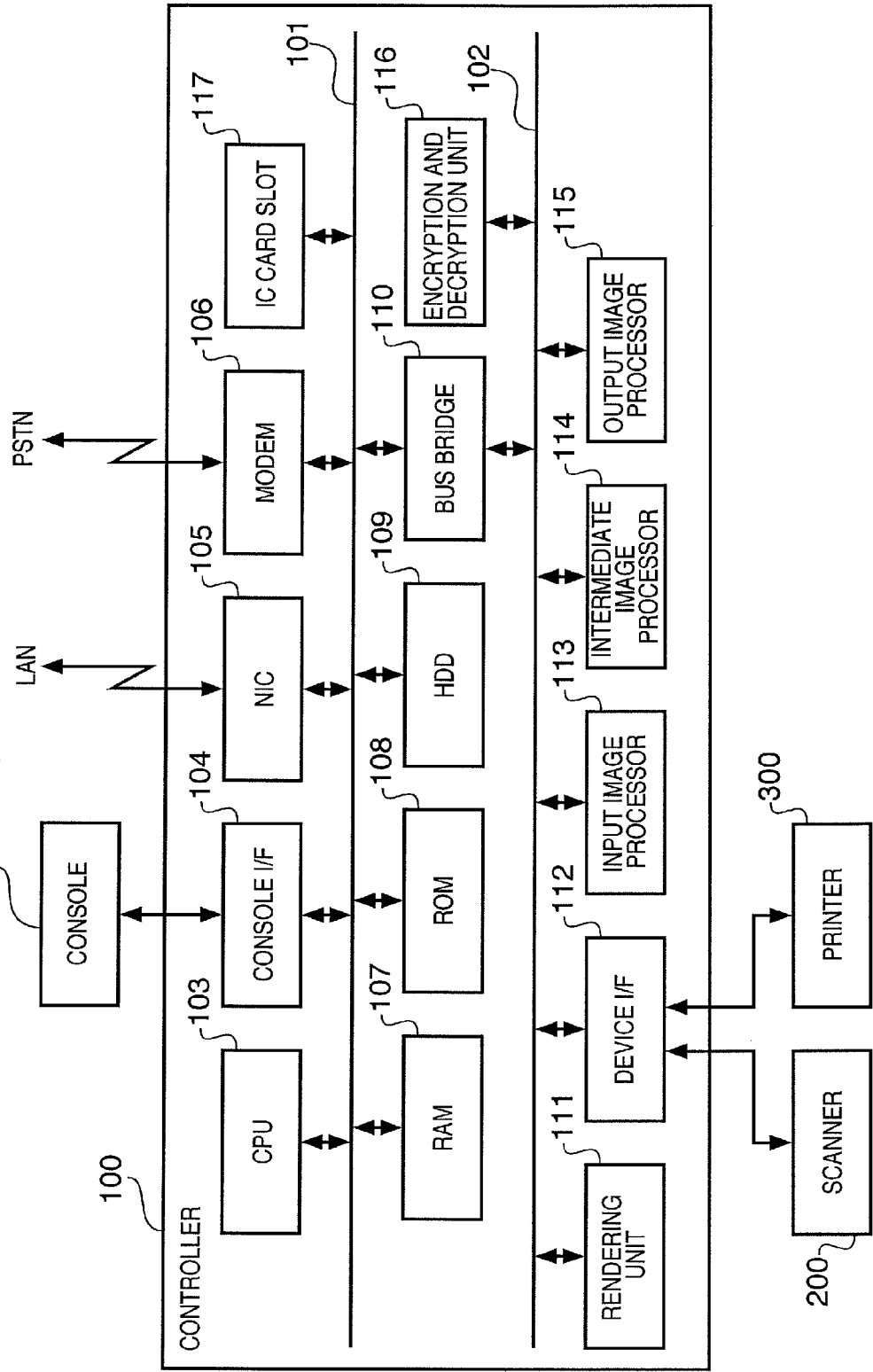
FIG. 17 is a block diagram showing the arrangement of an MFP.

FIG. 17 is a block diagram showing the arrangement of the MFP 1001 or 1002.

A controller 100 connects a scanner 200 and printer 300 to control them, and connects the network 1008 and PSTN to input and output image data and device information.

A CPU 103 executes control programs and image processing programs stored in a ROM 108 and hard disk drive (HDD) 109 using a RAM 107 as a work memory. The CPU 103 controls respective components to be described below via a system bus 101 and image bus 102. The RAM 107 and HDD 109 are also used as image memories for temporarily storing image data.

A console interface (I/F) 104 serves as an interface with a console 400 to transfer an input (instruction) of the user who operates the console 400 to the CPU 103, and to output image data to be displayed on an LCD of the console 400 to the console 400.

An NIC 105 serves as an interface with the network 1008, and exchanges data and information with the network 1008. A MODEM 106 serves as an interface with the PSTN, and makes a FAX communication and the like via the PSTN.

The above components are arranged on the system bus 101. A bus bridge 110 serves as an interface between the system bus 101 and image bus 102 which transfers image data at high speed, and bridges the data flow between the system bus 101 and image bus 102 by converting a data structure. Note that the image bus 102 comprises a high-speed serial bus such as a Peripheral Component Interconnect (PCI) bus, IEEE1394, or the like.

Components to be arranged on the image bus 102 will be described below. A rendering unit 111 renders PDL data into a bitmap image, and converts information appended to the PDL data into attribute flag data (to be described later) which can be used inside the controller 100.

A device I/F 112 serves as an interface between the image input and output devices (scanner 200 and printer 300 or the like) and converts synchronization/asynchronization of image data transfer. Note that the device I/F 112 and the image input and output devices are connected via a serial bus such as Universal Serial Bus (USB), IEEE1394, or the like.

An input image processor 113 applies correction, modification, and edit processes that consider the subsequent print processing or image transmission later to image data input from the scanner 200 or image data received from outside the apparatus via the NIC 105. An intermediate image processor 114 executes data compression and decompression processing and image magnification (enlargement and reduction) processing. An output image processor 115 applies correction, resolution conversion, and the like according to the printer 300 to image data to be printed. Note that the intermediate image processor 114 encodes multi-valued image data by JPEG, or binary image data by JBIG, MMR, or MH.

Note that image data and attribute flag data as the rendering result of the rendering unit 111 are often input to the intermediate image processor 114 without the intervention of the input image processor 113. As will be described later, upon processing image data received from outside the apparatus, that image data and attribute flag data assigned according to the settings from the console 400 are often input to the intermediate image processor 114 without the intervention of the input image processor 113.

By inputting an appropriate PIN (Personal Identifier Number) code to the console 400 after an IC card medium is inserted into an IC card slot 117, key information used in encryption and decryption can be input and output. An encryption and decryption unit 116 is a hardware accelerator card which encrypts and decrypts data using the key information in the IC card medium.

Figure 18:
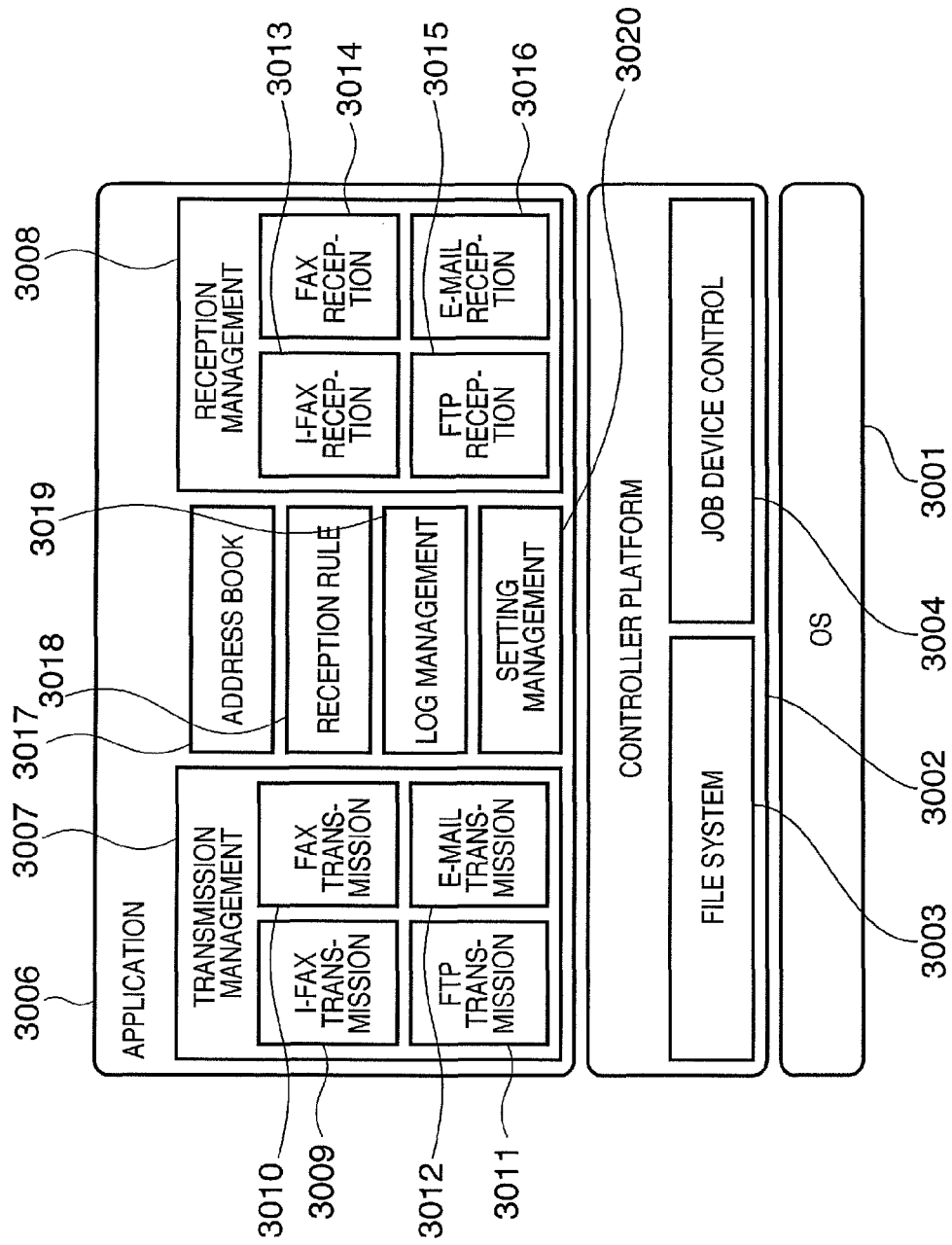
FIG. 18 is a block diagram showing the arrangement of software modules of a controller.

FIG. 18 is a block diagram showing the arrangement of software modules of the controller 100. Note that software to be executed by the CPU 103 of the controller 100 is implemented as so-called firmware.

An OS 3001 is a realtime operating system, and provides various resource management services and frameworks optimized to control an embedded system to software which runs on the OS 3001. The OS 3001 provides, for example, the following resource management services and frameworks.

That is, they include: multitask management (thread management) which makes a plurality of processes substantially parallelly run by managing a plurality of execution contexts of processes by the CPU 103; an inter-task communication which implements synchronization and data exchange between tasks; memory management; interrupt management; a protocol stack which implements processes of various protocols of various device drivers, local interfaces, networks, communications, and the like; and so forth.

A controller platform 3002 comprises a file system 3003 and job device control 3004. The file system 3003 is a mechanism which is built in the HDD 109, RAM 107, or the like, and stores data, and is used to spool jobs handled by the controller 100 and to save various data. The job device control 3004 controls hardware of the MFP, and controls jobs that use basic functions (print, scan, communication, image conversion, and the like) mainly provided by the hardware of the MFP.

An application 3006 is an embedded application which inputs and outputs image and text data via the network 1008 and PSTN using the mechanism provided by the OS 3001 and controller platform 3002. The application 3006 includes transmission management 3007 which integrally manages transmission jobs and reception management 3008 which integrally manages reception jobs as its principal mechanisms.

The transmission management 3007 comprises Internet FAX (I-FAX) transmission 3009, FAX transmission 3010, FTP transmission 3011, and E-mail transmission 3012, and controls transmission jobs. The reception management 3008 comprises I-FAX reception 3013, FAX reception 3014, FTP reception 3015, and E-mail reception 3016, and controls reception jobs. As a mechanism for supporting these transmission and reception, an address book 3017 which manages destination mail addresses and URIs (Uniform Resource Identifiers) is available. Also, such support mechanism includes a reception rule 3018 which manages processing rules upon reception, log management 3019 which manages transmission and reception logs, setting management 3020 which manages various kinds of setting information, and the like.

[Policy Data]

Figure 19:
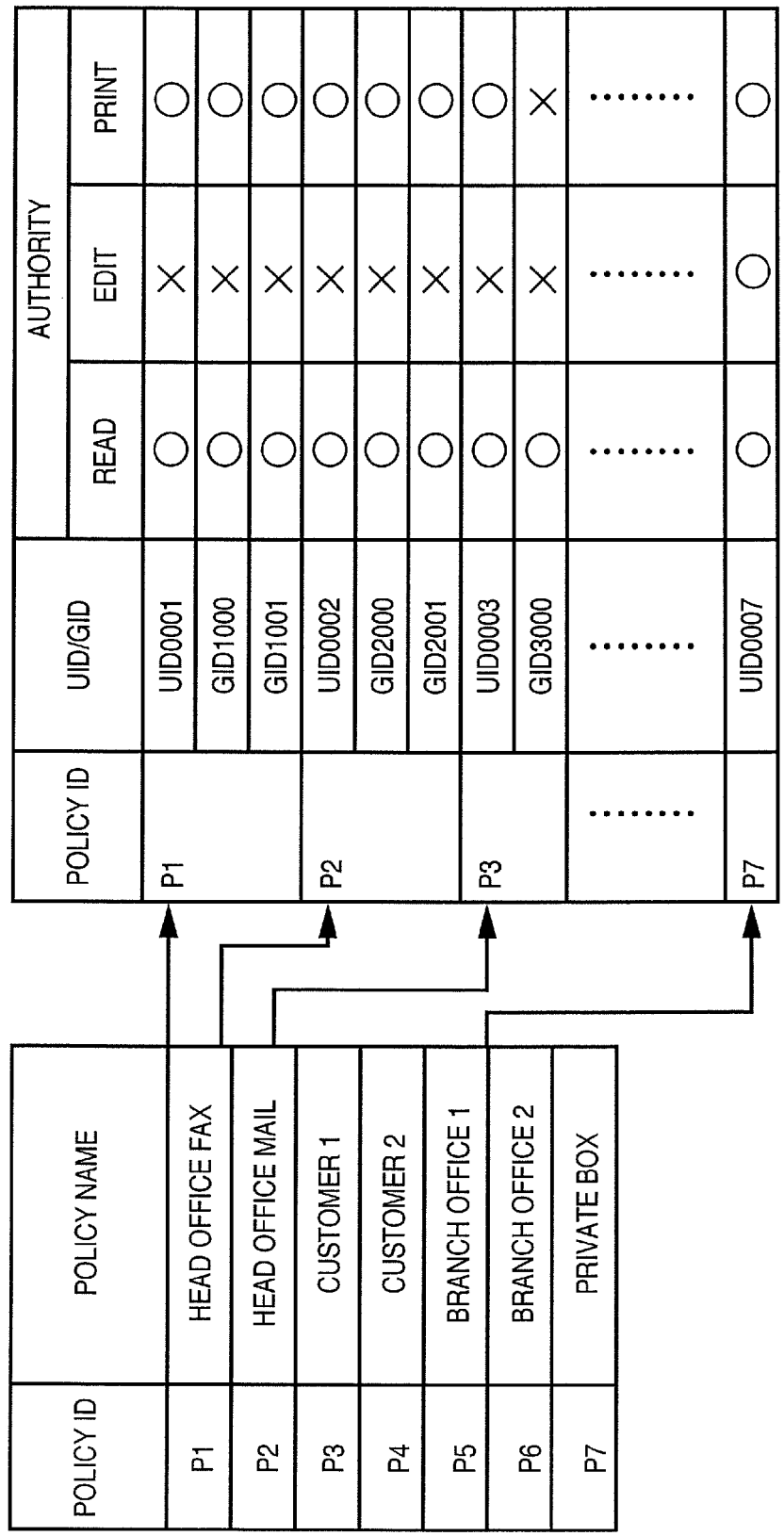
FIG. 19 shows an example of policy data managed by an access rights managing server.

FIG. 19 shows an example of policy data managed by the access rights managing server 1007.

The policy data includes fields indicating a policy ID used to identify a policy, a policy name as a character string required for the user to identify the policy, a UID/GID that records a user ID or group ID to which the policy is applied, and an authority granted to the UID/GID. The authority field stores a bit indicating permission/inhibition of data read, edit, and print. In FIG. 19, a ○ mark indicates permission, and a × mark indicates inhibition. With this policy data, the types of data operations permitted to the users or groups can be set for respective policies. Note that the access rights control method and access rights control ID of the first embodiment respectively correspond to the policy and policy ID.

[Digital Document List]

FIG. 20 shows an example of a digital document list managed by the access rights managing server 1007.

The digital document list represents the correspondence between the document IDs and policy IDs, and allows the user to refer to which policy is to be applied to which document.

[Digital Document Format]

Figure 21:
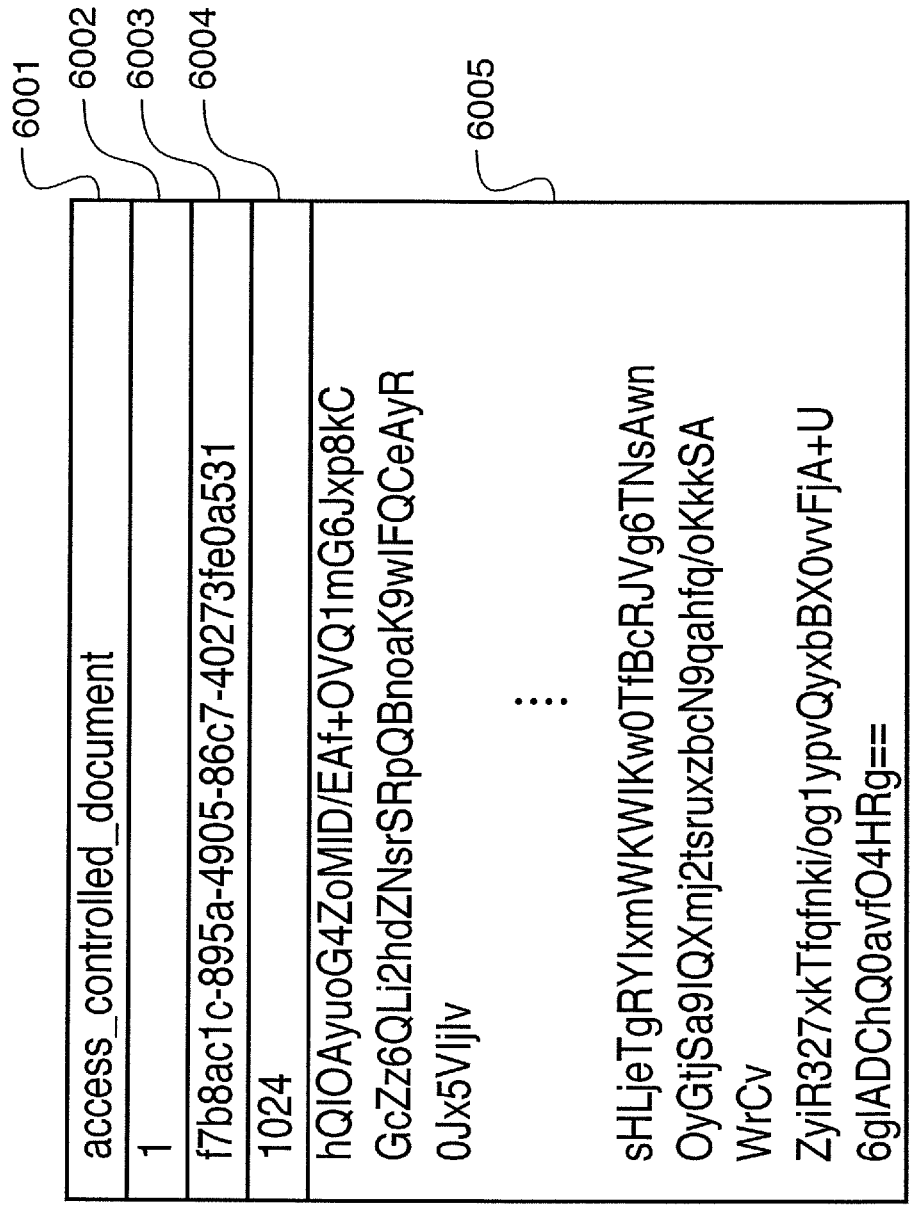
FIG. 21 shows an example of a digital document format.

FIG. 21 shows an example of a digital document format.

A file header 6001 represents information (specific character string) used to identify the digital document format. A version 6002 represents the version of the digital document format. A document ID 6003 indicates an identification ID unique to the digital document, and is used to determine a policy to be applied to the digital document. A data length 6004 represents the data size stored in a data part 6005. The data part 6005 is document data itself, which is encrypted by an encryption key issued by the access rights managing server 1007.

[Reception Rule]

FIG. 22 shows an example of data held by the reception rule 3018 shown in FIG. 18.

"Rule ID" is an identification ID unique to each rule, and is used in internal management. "Rule name" is an arbitrary character string required for the user to identify a rule. "Reception means" indicates a target as one of a plurality of reception software modules such as the I-FAX reception 3013, FAX reception 3014, FTP reception 3015, E-mail reception 3016, and the like.

"Comparison property" represents a property to be compared of various properties including a sender number, sender address, and the like included in a reception job. "Comparison value" represents a value used to compare the property designated as "comparison property" with the reception job. "Expression" is selected from comparison methods such as "equal to", "end with", "start with", and the like.

"Destination" indicates the destination of the digital document when the reception job matches conditions defined by "comparison property", "comparison value", and "expression". "Policy ID" represents a policy ID to set be in the digital document when the reception job similarly matches the conditions. The policy ID is a character string required for the user to identify a policy. Note that the MFP obtains the policy ID and policy name by communicating with the access rights managing server 1007.

Also, "user name" and "password" represent authentication information used when the MFP communicates with the access rights managing server 1007.

FIG. 23 shows an example of a rule registration window which is displayed on the console 400 or the like by the CPU 103 upon registering a rule in the reception rule 3018.

A rule shown in FIG. 23 sets a policy corresponding to a policy name "executive" in a digital document when the sender number of a received FAX document is equal to "123456789". Then, the rule transfers the digital document set with the policy to a path name "//server/honsya" by a file transfer protocol (ftp).

[Access Rights Control]

Figure 24A:
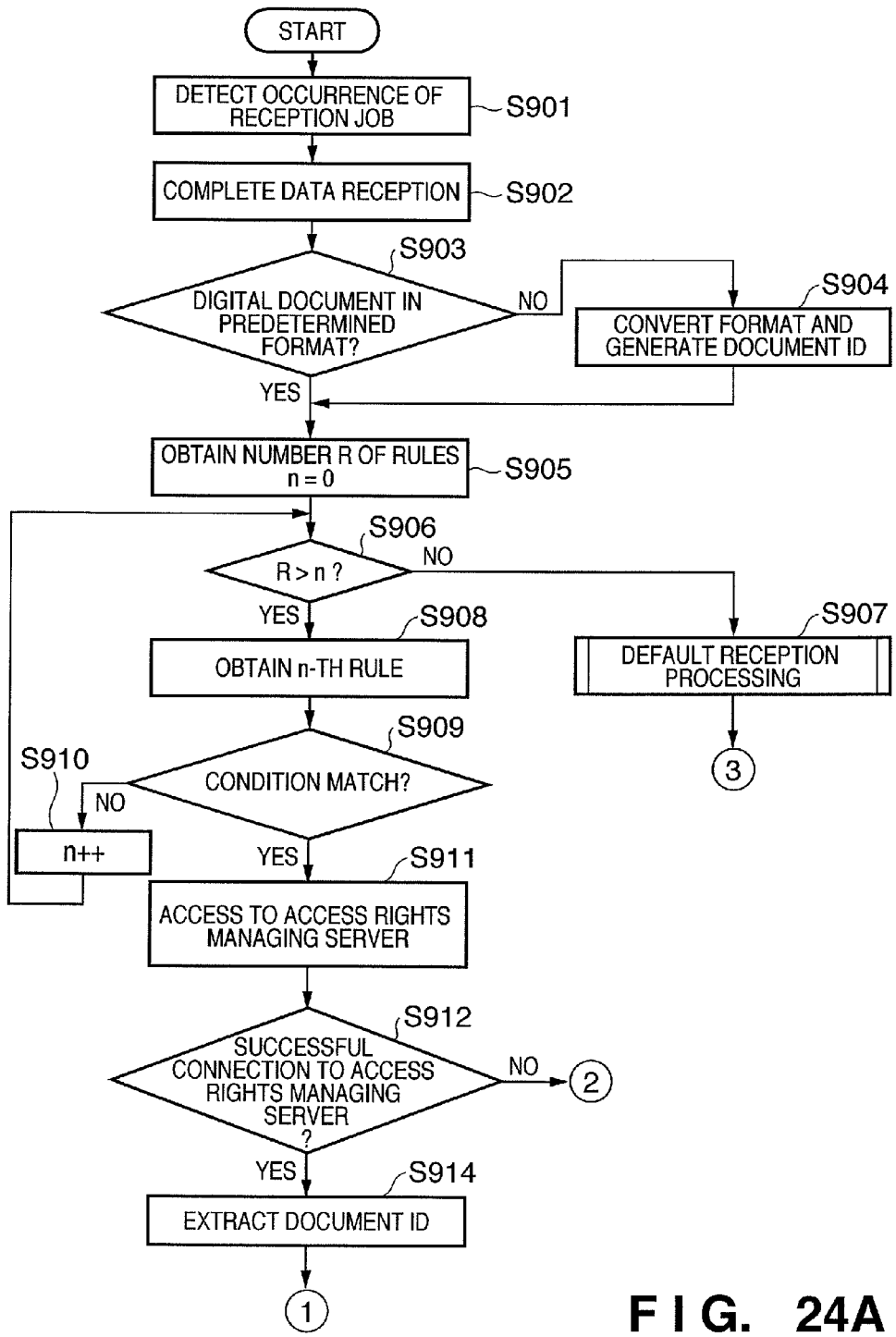
FIGS. 24A an 24B are flowcharts showing a processing example for setting a policy in a received digital document.

FIGS. 24A and 24B are flowcharts showing the processing for setting a policy in a received digital document. The CPU 103 executes this processing.

The CPU 103 detects occurrence of a reception job (S901). Upon completion of data reception (S902), the CPU 103 checks the format of the received digital document (S903). If the digital document has the format shown in FIG. 21, the process advances to step S905. However, in case of a FAX-received document encoded by MMR, MH, or JBIG, the CPU 103 performs format conversion and generates a document ID (S904). Note that the CPU 103 may acquire the document ID from the access rights managing server 1007 or the like. Also, in case of a file which is appended to a received e-mail message and does not have a predetermined format (a format incompatible to a policy setting), the CPU 103 executes the processing in step S904.

The CPU 103 then obtains the number R of registered rules from the reception rule 3018, and resets counter n to zero (S905). The CPU 103 checks if R>n (S906). If R≦n, since the reception rule is not a match, the CPU 103 executes default reception processing (S907), thus ending the processing. Note that the default reception processing is set in advance in the setting management 3020, and is processing for printing the digital document, storing it in the file system 3003, and so forth.

On the other hand, if R>n in step S906, the CPU 103 obtains the n-th rule (S908), and checks if the reception job matches the conditions of the obtained rule (S909). If the reception job does not match the conditions, the CPU 103 increments counter n (S910), and the process returns to step S906.

On the other hand, if the reception job matches the conditions of the obtained rule, the CPU 103 obtains information of the access rights managing server 1007 from the setting management 3020, and tries to establish connection to the access rights managing server 1007 (S911). The CPU 103 then checks if the connection trial has succeeded (S912). If the connection trial has failed, the CPU 103 stores the digital document in a save folder upon occurrence of an error, which is prepared in advance in the file system 3003 (S913), thus ending the processing.

On the other hand, if the connection trial to the access rights managing server 1007 has succeeded, the CPU 103 extracts the document ID from the digital document (S914), and obtains the policy ID and user authentication information set in the n-th rule (S915). The CPU 103 then transmits the document ID, policy ID, and user authentication information to the access rights managing server 1007 (S916). The CPU 103 checks a response from the access rights managing server 1007 (S917). If the policy setting has failed, the CPU 103 stores the digital document in the save folder upon occurrence of an error, which is prepared in advance in the file system 3003 (S913), thus ending the processing.

If the policy setting has succeeded, the CPU 103 encrypts the digital document using an encryption key included in the response from the access rights managing server 1007 (S918), and transmits the encrypted digital document to a destination set in the n-th rule or saves it in a box (S919), thus ending the processing.

Whether or not the policy setting has succeeded can be determined by interpreting the response from the access rights managing server 1007. Alternatively, if the response is appended with an encryption key, it may be determined that the policy setting has succeeded; otherwise, it may be determined that the policy setting has failed. After transmission of the encrypted digital document, the CPU 103 deletes the digital documents before and after encryption.

The CPU 103 challenges the policy setting again for the digital document which is stored in the error save folder due to a connection failure to the access rights managing server 1007 or a policy setting failure after an elapse of a predetermined period of time. Alternatively, a system administrator or an administrator of the MFP periodically checks the error save folder. If the administrator finds the stored digital document, he or she may instruct the CPU 103 to re-set the policy at that time. Of course, the CPU 103 preferably notifies a client terminal of the administrator of the above failure.

It is desired for a creator of a given digital document to set the access rights of that document according to the nature of the document and the like. However, digital documents received from the PSTN or network are not set with any access rights at all in some cases. A scheme for setting uniform access rights in digital documents is less flexible, and cannot set access rights that the user intended, resulting in inconvenience. By contrast, according to the fourth embodiment, a rule according to the reception means and sender information of a digital document is retrieved, and the access rights are set in the digital document according to the rule. Furthermore, since a distribution for transferring the digital document to a destination according to the reception means and sender information of the digital document or saving it in a box (specific storage area) of the MFP is implemented according to the rule, a flexible system can be realized.

Fifth Embodiment

Information processing according to the fifth embodiment of the present invention will be described below. Note that the same reference numerals in the fifth embodiment denote the same parts as in the first to fourth embodiments, and a detailed description thereof will be omitted.

[Reception Rule]

FIG. 25 shows an example of data held by the reception rule 3018 of the fifth embodiment, and an "overwrite" field is added. When the "overwrite" field is set to "ON", if a reception job matches the rule, and the digital document of the reception job is set with access rights, the access rights of the digital document are overwritten (updated) according to the reception rule.

FIG. 26 shows an example of a rule registration window which is displayed on the console 400 or the like by the CPU 103 upon registering a rule in the reception rule 3018.

A rule shown in FIG. 26 sets a policy corresponding to a policy name "executive" in a digital document when the sender address of an e-mail message is equal to "honsya@aaa.com". Then, the rule transfers the digital document set with the policy to a path name "//server/honsya" by a file transfer protocol (ftp). In this case, this rule overwrites access rights when the received digital document has already been set with the access rights.

[Access Rights Control]

Figure 27A:
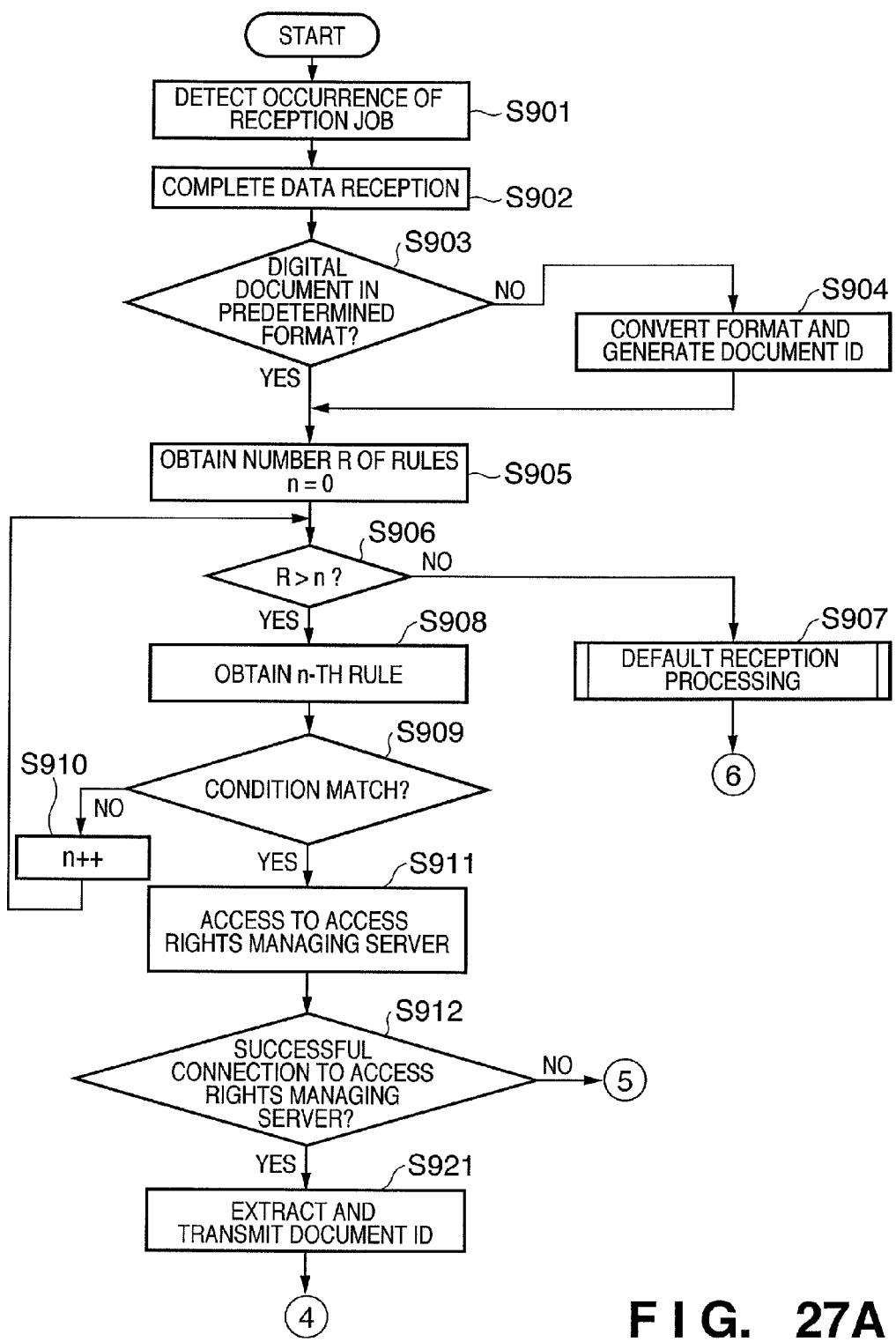
FIGS. 27A and 27B are flowcharts showing the processing for setting a policy in a received digital document.
Figure 27B:
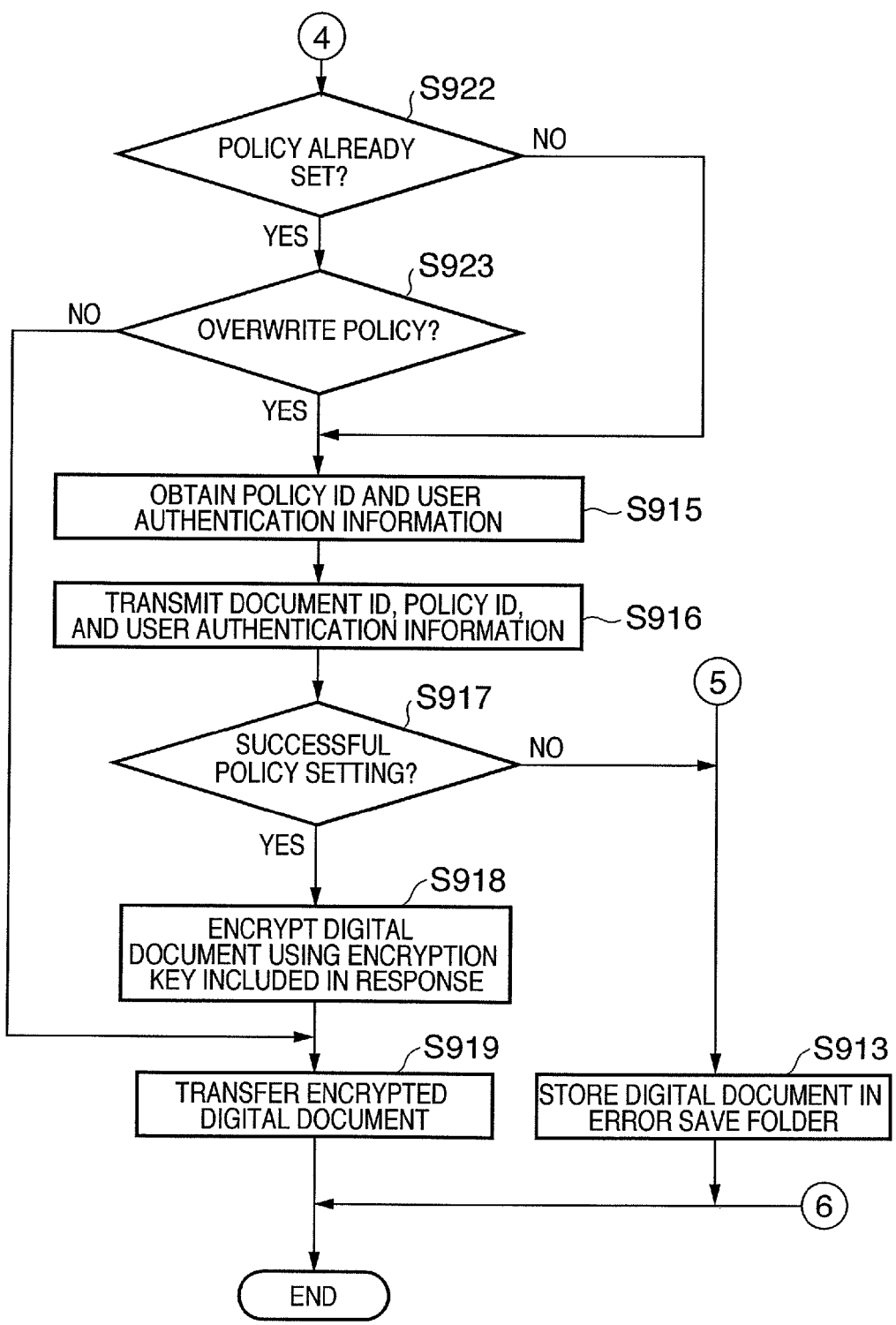

FIGS. 27A and 27B are flowcharts showing the processing for setting a policy in a received digital document according to the fifth embodiment. The CPU 103 executes this processing. Note that the same step numbers in FIGS. 27A and 27B denote the same processing steps as in FIGS. 24A and 24B, and a detailed description thereof will be omitted.

If the connection trial to the access rights managing server 1007 has succeeded in step S912, the CPU 103 extracts the document ID from the digital document and transmits it to the access rights managing server 1007 to inquire about a policy setting state (S921). The CPU 103 checks whether or not a policy is set (S922). If no policy is set in correspondence with the document ID, the CPU 103 executes the processes in step S915 and subsequent steps; otherwise, the CPU 103 checks with reference to the "overwrite" field of the n-th rule if the policy is overwritten (S923). If the policy is overwritten, the CPU 103 executes the processes in step S915 and subsequent steps; otherwise, the CPU 103 transfers the digital document to a destination set in the n-th rule (S919).

In this manner, whether the access rights set by the creator of a digital document take precedence or the rule set in the information apparatus that received the digital document takes precedence can be set using the "overwrite" field.

[Reception Log]

FIG. 28 shows an example of a reception log window including a policy setting log of received digital documents. The CPU 103 displays this window on the console 400.

A "policy assignment" field represents the setting conditions of policies to digital documents, "rule preference" indicates that the policy was set according to the reception rule, and "original preference" indicates that the existing policy was left. Also, "--" denoted by reference numeral 1302 represents that the reception rule is not a match, and "NG" indicates a connection failure to the access rights managing server 1007 or a policy setting failure.

The administrator of the system or information apparatus can recognize and follow how to set policies in received digital documents with reference to this reception log window.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-296961 filed Oct. 11, 2005, which is hereby incorporated by reference herein in its entirety.

What is claimed is:

1. An information processing method, comprising the steps of:
communicating, by an information processing apparatus, with an access rights managing server through a network, wherein the access right managing server manages an access rights control ID, which specifies access rights for a document file, and a document ID by associating the access rights control ID with the document ID to control the access rights for a document file specified by the document ID;
receiving facsimile data, which has no file format, from an external facsimile apparatus which cannot access the access right managing server;
converting an image part of the received facsimile data into a document file;
extracting an access rights control ID from a predetermined position of the received facsimile data;
transmitting the extracted access rights control ID to the access right managing server through the network;
receiving a document ID associated with the transmitted access rights control ID from the access right managing server in response to the transmission of the access rights control ID through the network; and
appending the document ID to the document file converter from the image part of the received facsimile data and storing the document file appended with the document ID in a memory.

2. The method according to claim 1, further comprising the steps of:
obtaining an encryption key corresponding to the document ID from the access right managing server through the network; and
encrypting the document file converted from the image part of the received facsimile data using the encryption key.

3. The method according to claim 1, wherein the access rights control ID is information that designates an access rights control method of the document file converted from the image part of the received facsimile data.

4. The method according to claim 3, wherein the document ID is information that indicates correspondence between the document file converted from the image part of the received facsimile data and the access rights control method.

5. An information processing method, comprising the steps of:
communicating, by an information processing apparatus, with an access rights managing server through a network, wherein the access right managing server manages an access rights control ID, which specifies access rights for data, and a document ID by associating the access rights control ID with the document ID to control the access rights for data specified by the document ID;
receiving data from an external apparatus which cannot access the access right managing server;
retrieving a rule, which matches predetermined information in the received data and is set in a table, wherein the rule prescribes a destination to which data is forwarded or a storage in which the data is saved, and prescribes an access rights control ID to be applied to the received data;
extracting a document ID from the received data;
transmitting the access rights control ID prescribed by the retrieved rule and the extracted document ID to the access right managing server through the network;
receiving an encryption key from the access right managing server through the network, wherein the access right managing server transmits the encryption key in response to receiving the access rights control ID and the document ID;
encrypting the received data using the encryption key; and
transmitting the encrypted data to the destination or saving the encrypted data in the storage in accordance with the retrieved rule.

6. The method according to claim 5, further comprising the step of converting the received data into a predetermined format when the received data does not have the predetermined format.

7. The method according to claim 5, further comprising the steps of:
receiving information from the access right managing server, wherein the information indicates whether or not the access rights control corresponding to the document ID has already been set; and
checking according to the retrieved rule whether or not the encryption key is to be obtained and the access rights control is to be set by encryption, in a case where the access rights control corresponding to the document ID has already been set.

8. The method according to claim 7, further comprising the step of transmitting the received data to the destination or saving the received data in the storage according to the retrieved rule, in a case where it is determined in the checking step that the setting of the access rights control is not made.

9. The method according to claim 7, further comprising the step of saving log information indicating a checking result of the checking step in a memory for each reception of the data.

10. An information processing apparatus capable to communicate with an access rights managing server through a network, the apparatus comprising:
a first receiver, arranged to receive facsimile data, which has no file format, from an external facsimile apparatus which cannot access the access right managing server;
a converter, arranged to convert an image part of the received facsimile data into a document file;
an extractor, arranged to extract an access rights control ID from a predetermined position of the received facsimile data;
a transmitter, arranged to transmit the extracted access rights control ID to the access right managing server through the network;

a second receiver, arranged to receive a document ID associated with the transmitted access rights control ID from the access right managing server in response to the transmission of the access rights control ID through the network; and a storing section, arranged to append the document ID to the document file converted from the image part of the received facsimile data and to store the document file appended with the document ID in a memory, wherein the access right managing server manages an access rights control ID, which specifies access rights for a document file, and a document ID by associating the access rights control ID with the document ID to control the access rights for a document file specified by the document ID.

11. An information processing apparatus capable to communicate with an access rights managing server through a network, the apparatus comprising:

a first receiver, arranged to receive data from an external apparatus which cannot access the access right managing server;

a retriever, arranged to retrieve a rule, which matches predetermined information in the received data and is set in a table, wherein the rule prescribes a destination to which the data is forwarded or a storage in which the data is saved, and prescribes an access rights control ID to be applied to the received data;

an extractor, arranged to extract a document ID from the received data;

a transmitter, arranged to transmit the access rights control ID prescribed by the retrieved rule and the extracted document ID to the access right managing server through the network;

a second receiver, arranged to receive an encryption key from the access right managing server through the network, wherein the access right managing server transmits the encryption key in response to receiving the access rights control ID and the document ID;

an encryption section, arranged to encrypt the received data using the encryption key; and a transfer section, arranged to transmit the encrypted data to the destination or to save the encrypted data in the storage in accordance with the retrieved rule, wherein the access right managing server manages an access rights control ID, which specifies access rights for data, and a document ID by associating the access rights control ID with the document ID to control the access rights for data specified by the document ID.

12. A non-transitory computer-readable medium storing a computer-executable program for causing a computer to perform an information processing method comprising the steps of:

communicating, by an information processing apparatus, with an access rights managing server through a network, wherein the access right managing server manages an access rights control ID, which specifies access rights for a document file, and a document ID by associating the access rights control ID with the document ID to control the access rights for a document file specified by the document ID;

receiving facsimile data, which has no file format, from an external facsimile apparatus which cannot access the access right managing server;

converting an image part of the received facsimile data into a document file;

extracting an access rights control ID from a predetermined position of the received facsimile data;

transmitting the extracted access rights control ID to the access right managing server through the network;

receiving a document ID associated with the transmitted access rights control ID from the access right managing server in response to the transmission of the access rights control ID through the network; and appending the document ID to the document file converter from the image part of the received facsimile data and storing the document file appended with the document ID in a memory.

13. A non-transitory computer-readable medium storing a computer-executable program for causing a computer to perform an information processing method comprising the steps of:

communicating, by an information processing apparatus, with an access rights managing server through a network, wherein the access right managing server manages an access rights control ID, which specifies access rights for data, and a document ID by associating the access rights control ID with the document ID to control the access rights for data specified by the document ID;

receiving data from an external apparatus which cannot access the access right managing server;

retrieving a rule, which matches predetermined information in the received data and is set in a table, wherein the rule prescribes a destination to which the data is forwarded or a storage in which the data is saved, and prescribes an access rights control ID to be applied to the received data;

extracting a document ID from the received data;

transmitting the access rights control ID prescribed by the retrieved rule and the extracted document ID to the access right managing server through the network;

receiving an encryption key from the access right managing server through the network, wherein the access right managing server transmits the encryption key in response to receiving the access rights control ID and the document ID;

encrypting the received data using the encryption key; and transmitting the encrypted data to the destination or saving the encrypted data in the storage in accordance with the retrieved rule.

* * * * *